US011302286B2

(12) United States Patent
Ekstrand et al.

(10) Patent No.: US 11,302,286 B2
(45) Date of Patent: Apr. 12, 2022

(54) PICTURE OBTAINING METHOD AND APPARATUS AND PICTURE PROCESSING METHOD AND APPARATUS

(71) Applicant: Huawei Technologies Co., Ltd., Shenzhen (CN)

(72) Inventors: Simon Ekstrand, Lund (SE); Sha Qian, Shenzhen (CN); Johan Larsby, Lund (SE); Haitao Dai, Shenzhen (CN); Fredrik Andreasson, Lund (SE); Jonas Hans Andreas Fredriksson, Lund (SE); Tim Jeppsson, Shenzhen (CN); Guolang Li, Dongguan (CN); Rubin Cai, Shenzhen (CN); Xueyan Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/033,223

(22) Filed: Sep. 25, 2020

(65) Prior Publication Data
US 2021/0020139 A1 Jan. 21, 2021

Related U.S. Application Data

(63) Continuation of application No. PCT/CN2019/096694, filed on Jul. 19, 2019.

(30) Foreign Application Priority Data

Jul. 20, 2018 (CN) .......................... 201810806509.3

(51) Int. Cl.
G09G 5/02 (2006.01)
G06T 7/13 (2017.01)
(Continued)

(52) U.S. Cl.
CPC ........... *G09G 5/026* (2013.01); *G06F 3/0414* (2013.01); *G06T 3/0093* (2013.01); *G06T 3/20* (2013.01);
(Continued)

(58) Field of Classification Search
CPC ............ G09G 5/026; G09G 2320/041; G09G 2320/0686; G09G 2354/00; G06T 7/13; G06T 3/0093; G06T 3/20; G06F 3/0414
See application file for complete search history.

(56) References Cited

U.S. PATENT DOCUMENTS 5,313,570 A    5/1994  Dermer et al.
5,825,919 A *  10/1998 Bloomberg ........ G06K 9/00463
                                                    382/177
(Continued)

FOREIGN PATENT DOCUMENTS

CN        1765119 A    4/2006
CN      102043434 A    5/2011
(Continued)

OTHER PUBLICATIONS

"From RGB color to grayscale color algorithm, carekee, Happy Learning," from cnblogs.com, retrieved from the internet:https://www.cnblogs.com/ on Oct. 27, 2020, total 3 pages.

*Primary Examiner* — David T Welch
(74) *Attorney, Agent, or Firm* — Leydig, Voit & Mayer, Ltd.

(57) ABSTRACT

A picture obtaining method and apparatus and a picture processing method and apparatus are provided. The method includes: obtaining a grayscale image corresponding to a first picture and a first image, where a size of the first picture is equal to a size of the first image, the first image includes N parallel lines, a spacing between two adjacent lines does not exceed a spacing threshold, and N is an integer greater than 1; translating a pixel included in each line in the first
(Continued)

Include N lines

Enlarged diagram of a line image based on the grayscale image, to obtain a second image, where the second image includes a contour of an image in the first picture; and set a pixel value of each pixel included in each line in the second image, to obtain a second picture.

42 Claims, 7 Drawing Sheets

(51) Int. Cl.
  *G06F 3/041*  (2006.01)
  *G06T 3/00*  (2006.01)
  *G06T 3/20*  (2006.01)
(52) U.S. Cl.
  CPC ......... *G06T 7/13* (2017.01); *G09G 2320/041* (2013.01); *G09G 2320/0686* (2013.01); *G09G 2354/00* (2013.01)

(56) References Cited

U.S. PATENT DOCUMENTS

| | | | | |
|---|---|---|---|---|
| 6,985,619 | B1 * | 1/2006 | Seta | G06K 9/00798 |
| | | | | 382/154 |
| 8,384,740 | B1 * | 2/2013 | Ruzon | G06T 7/73 |
| | | | | 345/629 |
| 9,600,917 | B2 * | 3/2017 | Hasegawa | H04N 1/407 |
| 9,998,663 | B1 * | 6/2018 | Francois | H04N 5/23238 |
| 2010/0110093 | A1 * | 5/2010 | Nystad | G06T 11/203 |
| | | | | 345/584 |
| 2011/0110599 | A1 * | 5/2011 | Sata | G06F 40/58 |
| | | | | 382/229 |
| 2014/0218604 | A1 | 8/2014 | LIU et al. | |
| 2015/0042588 | A1 * | 2/2015 | Park | G06F 3/0412 |
| | | | | 345/173 |
| 2017/0076434 | A1 * | 3/2017 | Pyo | G06T 3/60 |
| 2017/0115943 | A1 * | 4/2017 | Hyun | G06F 3/04817 |
| 2017/0147552 | A1 * | 5/2017 | Carroll | G06K 9/6203 |
| 2017/0285841 | A1 * | 10/2017 | Kunimoto | G06F 3/04847 |
| 2017/0372460 | A1 * | 12/2017 | Zagaynov | G06T 3/0031 |
| 2018/0095647 | A1 * | 4/2018 | Chesnokov | G06F 3/04845 |
| 2018/0285660 | A1 * | 10/2018 | Ohara | G06K 9/00798 |
| 2018/0373960 | A1 * | 12/2018 | Xu | G06K 9/6202 |
| 2018/0376117 | A1 * | 12/2018 | Chen | H04N 9/3194 |
| 2019/0114775 | A1 * | 4/2019 | Ma | G06T 7/11 |
| 2019/0140030 | A1 * | 5/2019 | Huangfu | H01L 27/3279 |
| 2020/0013833 | A1 * | 1/2020 | Wang | H01L 27/3218 |

FOREIGN PATENT DOCUMENTS

| | | |
|---|---|---|
| CN | 101547292 B | 6/2011 |
| CN | 102496021 A | 6/2012 |
| CN | 103236070 A | 8/2013 |
| CN | 103279965 A | 9/2013 |
| CN | 102331838 B | 4/2014 |
| CN | 103927727 A | 7/2014 |
| CN | 104915976 A | 9/2015 |
| CN | 103236071 B | 6/2016 |
| CN | 105975239 A | 9/2016 |
| CN | 106933474 A | 7/2017 |
| CN | 107622504 A | 1/2018 |
| CN | 109240572 A | 1/2019 |

* cited by examiner

PICTURE OBTAINING METHOD AND APPARATUS AND PICTURE PROCESSING METHOD AND APPARATUS

CROSS-REFERENCE TO RELATED APPLICATIONS

This application is a continuation of International Application No. PCT/CN2019/096694, filed on Jul. 19, 2019, which claims priority to Chinese Patent Application No. 201810806509.3, filed on Jul. 20, 2018 and entitled "PICTURE OBTAINING METHOD AND APPARATUS AND PICTURE PROCESSING METHOD AND APPARATUS", which is incorporated herein by reference in its entirety.

TECHNICAL FIELD

This application relates to the communications field, and in particular, to a picture obtaining method and apparatus and a picture processing method and apparatus.

BACKGROUND

A screen of a mobile terminal such as a mobile phone, a wearable device, or a tablet computer usually enters an off state when not in use. To improve aesthetics, after the mobile terminal enters the off state, a preset picture may be displayed on the screen of the mobile terminal.

For example, a preset picture used to indicate weather may be prestored in the mobile terminal. After it is detected that the mobile terminal enters the off state, the preset picture prestored in the mobile terminal may be obtained, and then the preset picture is displayed on the screen of the mobile terminal.

In a process of implementing this application, the inventor finds that the prior art has at least the following problems:

Currently, after a mobile terminal enters an off state, a preset picture stored in the mobile terminal is obtained, and the preset picture is displayed. In this way, unvarying preset pictures are displayed on mobile terminals, which is monotonous.

SUMMARY

To relieve monotony of unvarying preset pictures displayed, embodiments of this application provide a picture obtaining method and apparatus and a picture processing method and apparatus. The technical solutions are as follows:

According to a first aspect, an embodiment of this application provides a picture obtaining method, where the method includes: obtaining a grayscale image corresponding to a first picture and a first image, where a size of the first picture is equal to a size of the first image, the first image includes N parallel lines, a spacing between two adjacent lines does not exceed a spacing threshold, and N is an integer greater than 1; translating a pixel included in each line in the first image based on the grayscale image, to obtain a second image, where the second image includes a contour of an image in the first picture; and setting a pixel value of each pixel included in each line in the second image to obtain a second picture. In this way, the obtained second picture may be displayed after the screen of the terminal turns off. After the screen of the terminal turns off, the second picture is generated based on the original first picture. Therefore, different pictures used for display in a screen off mode may be obtained on different terminals, to relieve monotony of unvarying preset pictures displayed.

In a possible implementation of the first aspect, the method includes: converting each line in the first image into a curved image to obtain a third image; and translating a pixel included in each line in the third image based on the grayscale image, to obtain the second image. The grayscale image includes information about the image in the first picture, and therefore the translated second image includes the contour of the image in the first picture.

In a possible implementation of the first aspect, the method includes: obtaining a random value of a pixel included in a first line based on a position of the pixel included in the first line by using a random function, where the first line is any line in the first image; obtaining a first offset value of the pixel included in the first line based on the random value of the pixel included in the first line and a spacing between the first line and a second line, where the second line is an adjacent line of the first line; and separately translating the pixel included in the first line based on the first offset value of the pixel included in the first line, to obtain a curved line.

In a possible implementation of the first aspect, the method includes: obtaining a grayscale value of a pixel included in a third line from the grayscale image based on a position of the pixel included in the third line, where the third line is any line in the third image; obtaining a second offset value of the pixel included in the third line based on the grayscale value of the pixel included in the third line; and translating the pixel included in the third line based on the second offset value of the pixel included in the third line. The grayscale image includes the information about the image in the first picture, and therefore the translated second image includes the contour of the image in the first picture.

In a possible implementation of the first aspect, the method includes: obtaining a target image region from the first picture based on a target position of a target pixel, where the target pixel is a pixel included in any line in the second image, a position of a central pixel in the target image region is the target position, and a radius of the target image region is a first radius threshold; calculating a target pixel value based on a pixel value of each pixel in the target image region; and setting a pixel value of the target pixel to the target pixel value. The target pixel value is obtained based on the pixel value of the pixel in the target image region, and therefore the second picture obtained after the pixel value is set for the pixel in the second image is more abstract and more artistic than the first picture.

In a possible implementation of the first aspect, the method includes: obtaining environmental factor information of a current environment, where the environmental factor information includes at least one of a geographical environment type, temperature information, and time information; obtaining, based on the environmental factor information of the current environment, an environmental color pixel value corresponding to the current environment from a correspondence between environmental factor information and an environmental color pixel value; and setting the pixel value of each pixel included in each line in the second image to the environmental color pixel value corresponding to the current environment, to obtain the second picture. In this way, a color of an image in the second picture adapts to the current environment, thereby improving a display effect of the second picture.

In a possible implementation of the first aspect, the method includes: displaying the second picture on a screen of the terminal; or superimposing a gradient mask on the second picture to obtain a third picture, and displaying the third picture on a screen of the terminal, where the gradient mask includes a display region and a non-display region, transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower. Gradient display may be implemented by using the gradient mask, so that a display effect of displaying the third picture may be improved.

In a possible implementation of the first aspect, the method includes: obtaining a touch parameter for touching the screen of the terminal, where the touch parameter includes at least one of a touch point position, a touch area, and pressure for pressing the screen of the terminal; and performing, based on the touch parameter, an operation used to adjust a display effect of the third picture. In this way, an effect of displaying the third picture may be dynamically changed when a user touches the screen of the terminal. Therefore, the display effect of the third picture is adjusted, thereby improving user experience.

In a possible implementation of the first aspect, the method includes: when the touch parameter includes the touch point position, obtaining a first pixel set and a second pixel set from pixels included in lines in the third picture, where the first pixel set includes a first pixel whose distance from the touch point position is less than or equal to a first distance threshold, and the second pixel set includes a second pixel whose distance from the touch point position is greater than the first distance threshold; obtaining a third offset value of each first pixel in the first pixel set and a fourth offset value of each second pixel in the second pixel set, where the third offset value of each first pixel is greater than the fourth offset value of each second pixel, or the third offset value of each first pixel is less than the fourth offset value of each second pixel; and separately translating each first pixel based on the third offset value of each first pixel and a relative position between each first pixel and the touch point position, and separately translating each second pixel based on the fourth offset value of each second pixel and a relative position between each second pixel and the touch point position. In this way, when the user touches the third picture, the line in the third picture may move in a direction close to the touch point position or in a direction away from the touch point position.

In a possible implementation of the first aspect, the method includes: when the touch parameter includes the touch point position, obtaining a distance between the pixel included in each line in the third picture and the touch point position; obtaining a first brightness adjustment value of the pixel included in each line in the third picture based on the distance between the pixel included in each line in the third picture and the touch point position; and adjusting, based on the first brightness adjustment value of the pixel included in each line in the third picture, brightness of displaying the pixel included in each line in the third picture. In this way, a pixel closer to the touch point position of the user may be displayed with higher brightness.

In a possible implementation of the first aspect, the method includes: when the touch parameter includes the pressure for pressing the screen of the terminal, obtaining a second brightness adjustment value based on the pressure for pressing the screen of the terminal, and adjusting, based on the second brightness adjustment value, the brightness of displaying the pixel included in each line in the third picture; and/or when the touch parameter includes the touch area, obtaining the radius of the display region included in the gradient mask based on the touch area, and adjusting an area of the display region included in the gradient mask based on the radius. In this way, when the user presses the screen of the terminal, the brightness of displaying the picture and/or the area of the display region included in the gradient mask may be changed, thereby improving a display effect.

In a possible implementation of the first aspect, the method includes: obtaining data collected by at least one sensor in the terminal, obtaining a third brightness adjustment value based on the collected data, and adjusting, based on the third brightness adjustment value, the brightness of displaying the pixel included in each line in the third picture; or obtaining user vital sign data collected by a wearable device, obtaining a fourth brightness adjustment value based on the user vital sign data, and adjusting, based on the fourth brightness adjustment value, the brightness of displaying the pixel included in each line in the third picture. In this way, the brightness of displaying the picture may be changed based on the data collected by the sensor or the user vital sign data, thereby improving a display effect.

In a possible implementation of the first aspect, the method includes: when duration for displaying the third picture reaches a duration threshold, obtaining a fourth picture taken by a front-facing camera of the terminal; and when the fourth picture includes a human eye image, displaying the third picture in a first time period, where the first time period is a time period that is closest to a current time and whose duration is preset duration. When the display duration reaches the duration threshold, if the fourth picture includes the human eye image, it indicates that the user is viewing the screen of the terminal, and continuing to display the third picture may improve user experience.

In a possible implementation of the first aspect, the method includes: when the fourth picture does not include a human eye image, and it is detected that the terminal is operated by the user or that a distance between an obstacle in front of the screen of the terminal and the screen of the terminal is less than a second distance threshold, displaying the third picture in the first time period. When it is detected that the distance between the obstacle in front of the screen of the terminal and the screen of the terminal is less than the second distance threshold, it indicates that the user approaches the terminal. When the user approaches the terminal or operates the terminal, the user may view the screen of the terminal. Therefore, the third picture is displayed, to improve user experience.

In a possible implementation of the first aspect, the method includes: when it is detected that the terminal is operated by the user and enters the screen off mode, displaying the third picture on the screen of the terminal; or when it is detected that the distance between the obstacle in front of the screen of the terminal and the screen of the terminal is less than a first distance threshold and the screen off mode is entered, displaying the third picture on the screen of the terminal. When operating the terminal, the user may view the screen of the terminal. Alternatively, when it is detected that the distance between the obstacle in front of the screen of the terminal and the screen of the terminal is less than the second distance threshold, it indicates that the user approaches the terminal. When the user approaches the terminal or operates the terminal, the user may view the screen of the terminal. Therefore, the third picture is displayed, to improve user experience.

According to a second aspect, an embodiment of this application provides a picture processing method, where the method includes: displaying a target picture, where the target picture includes a contour of an image generated based on a line; obtaining a touch parameter for touching a screen of the terminal, where the touch parameter includes at least one of a touch point position, a touch area, and pressure for pressing the screen of the terminal; and performing, based on the touch parameter, an operation used to adjust a display effect of the target picture. In this way, an effect of displaying the target picture may be dynamically changed when a user touches the screen of the terminal. Therefore, the display effect of the target picture is adjusted, thereby improving user experience. For a method for generating the target picture, reference may be made to the method for obtaining a picture (for example, a second picture) including a contour that is disclosed in the first aspect and the implementations.

In a possible implementation of the second aspect, the method includes: when the touch parameter includes the touch point position, obtaining a first pixel set and a second pixel set from pixels included in lines in the target picture, where the first pixel set includes a first pixel whose distance from the touch point position is less than or equal to a first distance threshold, and the second pixel set includes a second pixel whose distance from the touch point position is greater than the first distance threshold; obtaining a first offset value of each first pixel in the first pixel set and a second offset value of each second pixel in the second pixel set, where the first offset value of each first pixel is greater than the second offset value of each second pixel, or the first offset value of each first pixel is less than the second offset value of each second pixel; and separately translating each first pixel based on the first offset value of each first pixel and a relative position between each first pixel and the touch point position, and separately translating each second pixel based on the second offset value of each second pixel and a relative position between each second pixel and the touch point position. In this way, when the user touches the target picture, the line in the target picture may move in a direction close to the touch point position or in a direction away from the touch point position.

In a possible implementation of the second aspect, the method includes: when the touch parameter includes the touch point position, obtaining a distance between a pixel included in each line in the target picture and the touch point position; obtaining a first brightness adjustment value of the pixel included in each line in the target picture based on the distance between the pixel included in each line in the target picture and the touch point position; and adjusting, based on the first brightness adjustment value of the pixel included in each line in the target picture, brightness of displaying the pixel included in each line in the target picture. In this way, a pixel closer to the touch point position of the user may be displayed with higher brightness.

In a possible implementation of the second aspect, the method includes: when the touch parameter includes the pressure for pressing the screen of the terminal, obtaining a second brightness adjustment value based on the pressure for pressing the screen of the terminal, and adjusting, based on the second brightness adjustment value, the brightness of displaying the pixel included in each line in the target picture. In this way, when the user presses the screen of the terminal, the brightness of displaying the picture may be changed, thereby improving a display effect.

In a possible implementation of the second aspect, the method includes: superimposing a gradient mask on the target picture to obtain a third picture, and displaying the third picture, where the gradient mask includes a display region and a non-display region, and transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower. Gradient display may be implemented by using the gradient mask, so that a display effect of displaying the picture may be improved.

In a possible implementation of the second aspect, the method includes: when the touch parameter includes the touch area, obtaining the radius of the display region included in the gradient mask based on the touch area, and adjusting an area of the display region included in the gradient mask based on the radius. In this way, when the user presses the screen of the terminal, the area of the display region included in the gradient mask may be changed, thereby improving a display effect.

In a possible implementation of the second aspect, the method includes: obtaining data collected by at least one sensor in the terminal, obtaining a third brightness adjustment value based on the collected data, and adjusting, based on the third brightness adjustment value, the brightness of displaying the pixel included in each line in the target picture; or obtaining user vital sign data collected by a wearable device, obtaining a fourth brightness adjustment value based on the user vital sign data, and adjusting, based on the fourth brightness adjustment value, the brightness of displaying the pixel included in each line in the target picture. In this way, the brightness of displaying the picture may be changed based on the data collected by the sensor or the user vital sign data, thereby improving a display effect.

In a possible implementation of the second aspect, the method includes: when duration for displaying the target picture reaches a duration threshold, obtaining a picture taken by a front-facing camera of the terminal; and when the picture includes a human eye image, displaying the target picture in a first time period, where the first time period is a time period that is closest to a current time and whose duration is preset duration. When the display duration reaches the duration threshold, if the picture includes the human eye image, it indicates that the user is viewing the screen of the terminal, and continuing to display the target picture may improve user experience.

In a possible implementation of the second aspect, the method includes: when the picture does not include a human eye image, and it is detected that the terminal is operated by the user or that a distance between an obstacle in front of the screen of the terminal and the screen of the terminal is less than a second distance threshold, displaying the target picture in the first time period. When it is detected that the distance between the obstacle in front of the screen of the terminal and the screen of the terminal is less than the second distance threshold, it indicates that the user approaches the terminal. When the user approaches the terminal or operates the terminal, the user may view the screen of the terminal. Therefore, the target picture is displayed, to improve user experience.

According to a third aspect, this application provides a picture obtaining apparatus, configured to perform the method in any one of the first aspect or the possible implementations of the first aspect. Specifically, the apparatus includes a unit configured to perform the method in any one of the first aspect or the possible implementations of the first aspect.

According to a fourth aspect, this application provides a picture processing apparatus, configured to perform the method in any one of the second aspect or the possible implementations of the second aspect. Specifically, the apparatus includes a unit configured to perform the method in any one of the second aspect or the possible implementations of the second aspect.

According to a fifth aspect, this application provides a picture obtaining apparatus, where the apparatus includes at least one processor and at least one memory, the at least one memory stores one or more programs, the one or more programs are configured to be executed by the at least one processor, and the one or more programs include an instruction for performing the method in any one of the first aspect or the possible implementations of the first aspect.

According to a sixth aspect, this application provides a picture processing apparatus, where the apparatus includes at least one processor and at least one memory, the at least one memory stores one or more programs, the one or more programs are configured to be executed by the at least one processor, and the one or more programs include an instruction for performing the method in any one of the second aspect or the possible implementations of the second aspect.

According to a seventh aspect, this application provides a computer program product, where the computer program product includes a computer program stored in a computer-readable storage medium, and the computing program is loaded by a processor to implement the method in any one of the first aspect, the second aspect, the possible implementations of the first aspect, or the possible implementations of the second aspect.

According to an eighth aspect, this application provides a nonvolatile computer-readable storage medium, configured to store a computer program, where the computer program is loaded by a processor to execute an instruction for the method in any one of the first aspect, the second aspect, the possible implementations of the first aspect, or the possible implementations of the second aspect.

According to a ninth aspect, an embodiment of this application provides a chip, where the chip includes a programmable logic circuit and/or a program instruction, and when the chip runs, the chip is configured to implement the method in any one of the first aspect, the second aspect, the possible implementations of the first aspect, or the possible implementations of the second aspect.

BRIEF DESCRIPTION OF DRAWINGS

FIG. 2-1 is a schematic structural diagram of a picture obtaining apparatus according to an embodiment of this application;

FIG. 2-2 is a schematic structural diagram of another picture obtaining apparatus according to an embodiment of this application;

FIG. 3-1 is a flowchart of a picture obtaining method according to an embodiment of this application;

FIG. 3-2 is an effect diagram of a first image according to an embodiment of this application;

FIG. 3-3 is an effect diagram of a translated third image according to an embodiment of this application;

FIG. 3-4 is an effect diagram of a translated second image according to an embodiment of this application;

FIG. 3-5 is an effect diagram of a second picture obtained after a pixel value is set according to an embodiment of this application;

FIG. 4-1 is a flowchart of a picture processing method according to an embodiment of this application;

FIG. 4-2 is a display effect diagram of a gradient mask according to an embodiment of this application;

FIG. 4-3 is a display effect diagram of a touch picture according to an embodiment of this application;

FIG. 5 is a schematic structural diagram of a picture obtaining apparatus according to an embodiment of this application;

DESCRIPTION OF EMBODIMENTS

The following further describes in detail the embodiments of this application with reference to accompanying drawings.

Figure 1:
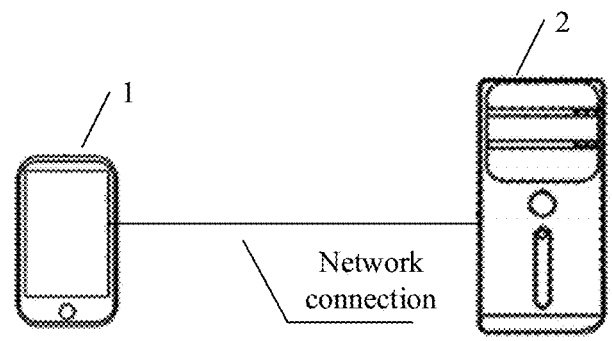
FIG. 1 is a schematic structural diagram of a communications system according to an embodiment of this application.

Referring to FIG. 1, an embodiment of this application provides a communications system. The communications system may include a terminal 1 and a server 2.

A network connection is established between the terminal 1 and the server 2. The network connection may be a wired connection, a wireless connection, or the like.

The terminal 1 may obtain a picture that needs to be displayed after the terminal 1 enters a screen off mode, and display the picture after the terminal 1 enters the screen off mode.

Optionally, the terminal 1 generates the picture. Alternatively, the server 2 may generate the picture, and send the picture to the terminal 1.

Optionally, the terminal 1 may be a mobile phone, a tablet computer, a personal computer, a laptop, or the like.

To better describe this application, the following first describes concepts such as a picture and an image in this application in detail. In this application, a picture refers to a data structure used to store an image in a computer system, and picture formats include but are not limited to various existing picture formats (such as JPG, GIF, and PNG). Data in a picture file not only includes data that directly reflects an image (referred to as "image data" below, for example, the image includes several pixels, and each pixel may correspond to one piece of data), but also includes some other information (for example, file header information) used to reflect a picture format. It may be understood that processing of a picture mainly means processing of image data. The image data is processed, so that an image corresponding to the image data is changed. In addition, for ease of description, in this application, description of "processing an image" actually means processing image data to achieve an effect for the image. For example, "performing processing of increasing brightness of an image" means "making specific adjustment to image data to finally increase the brightness of the image".

Figures 1, 2:
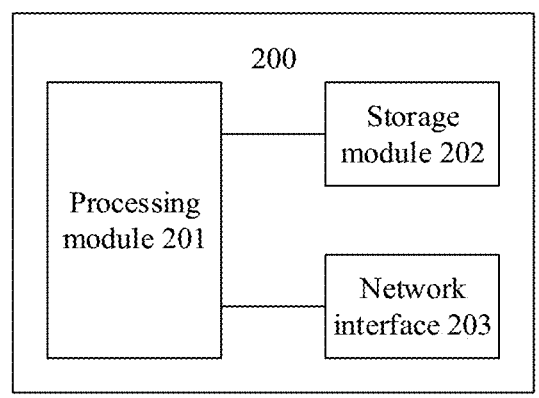
Figure 2:
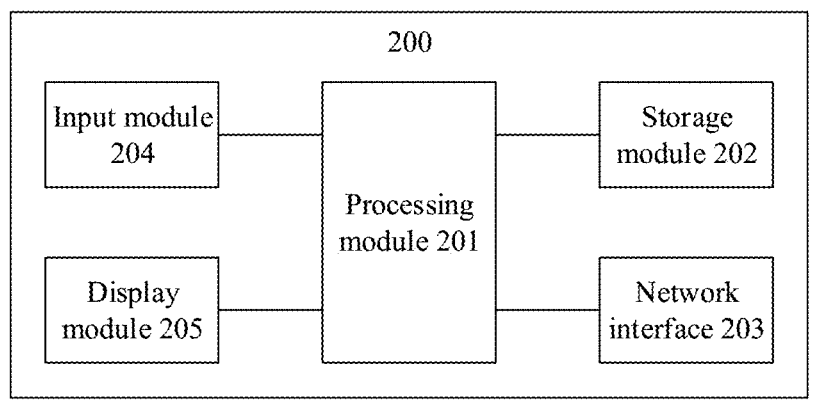

Referring to FIG. 2-1, this application provides a picture obtaining apparatus 200. The apparatus 200 may be the terminal 1, a part in the terminal 1, the server 2, or a part in the server 2, and includes:

a processing module 201, a storage module 202, and a network interface 203.

The storage module 202 may store static data and a rule required by the processing module 201 and another module in the apparatus 200, and is further configured to store a software program that can be executed by the processing module 201.

The network interface 203 may provide a voice or data communication capability, and may provide a wired or wireless interface. The network interface 203 includes an RF receiving element, a GPS receiving element, and/or another element, and may be a combination of software and hardware (an antenna, a modulator/demodulator, an encoder/decoder, an analog/digital processing circuit, and the like).

The processing module 201 may be configured to obtain a picture that needs to be displayed after the terminal 1 enters a screen off mode. If the apparatus 200 is the server 2 or a part in the server 2, the processing module 201 may further send the picture to the terminal 1 by using the network interface 203.

Optionally, referring to FIG. 2-2, when the apparatus 200 is the terminal 1 or a part in the terminal 1, the apparatus 200 may further include an input module 204 and a display module 205.

The input module 204 and the display module 205 may be configured to provide a user interface. The input module 204 may include a touchscreen, a keyboard, a touchpad, a mouse, or another indication device.

The display module 205 may display the picture obtained by the processing module 201, or may display a picture sent by the server 2.

Figures 1, 3:
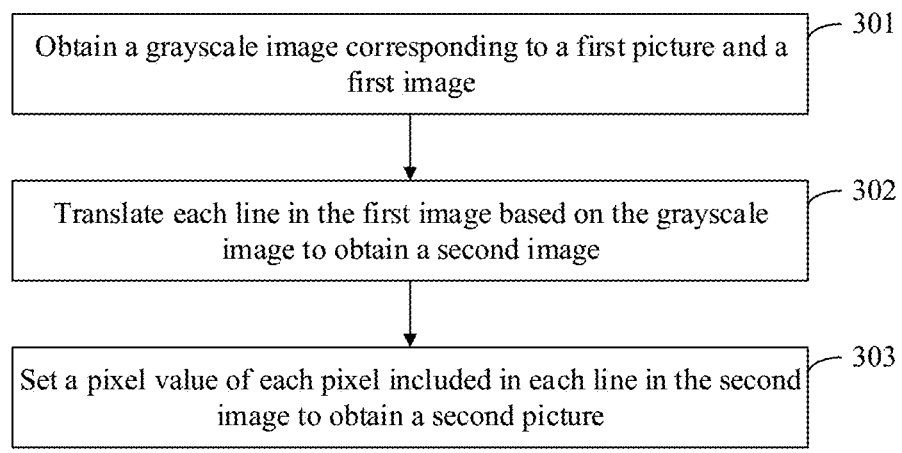
Figures 2, 3:
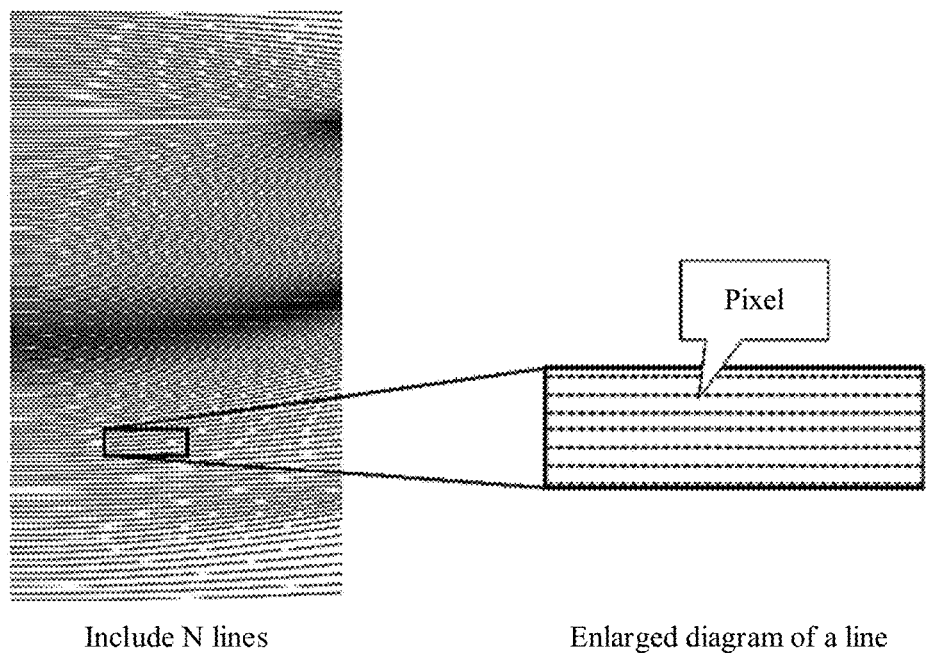
Figure 3:
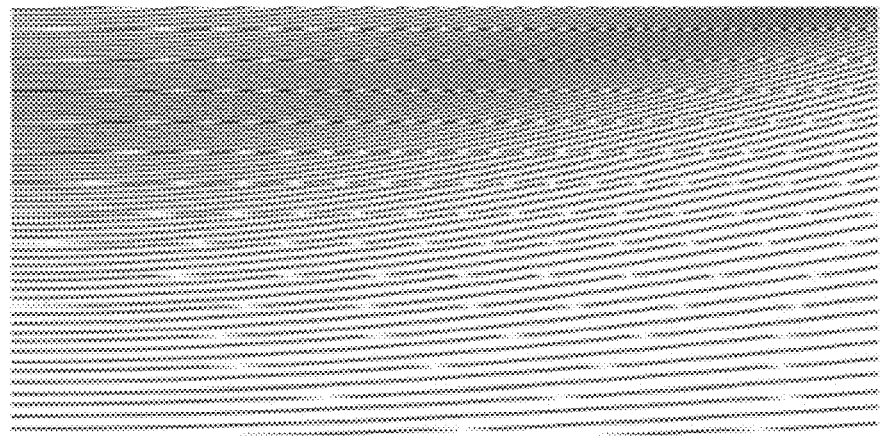

Referring to FIG. 3-1, an embodiment of this application provides a picture obtaining method. The method may be applied to the system shown in FIG. 1, and the method includes the following steps.

Step 301: Obtain a grayscale image corresponding to a first picture and a first image, where a size of the first picture (namely, a size of an image corresponding to the picture) is equal to a size of the first image, the first image includes N parallel lines, a spacing between two adjacent lines does not exceed a spacing threshold, and N is an integer greater than 1.

A value of the spacing threshold may be set by a user based on a requirement of the user. For example, the spacing threshold may be set to be equal to 10 pixels, 20 pixels, 50 pixels, 80 pixels, or 100 pixels. If the user requires that the first image includes densely spaced lines, the spacing threshold may be set to a small value. If the user requires that the first image includes sparsely spaced lines, the spacing threshold may be set to a large value.

Before this step is performed, the first picture needs to be first obtained.

When this embodiment is executed by a terminal, a manner of obtaining the first picture by the terminal may be an implementation such as downloading a picture from the Internet as the first picture, taking a picture as the first picture, obtaining a picture from a local album as the first picture, or obtaining a wallpaper picture from a local folder used to store wallpaper pictures as the first picture.

When this embodiment is executed by a server, a terminal obtains the first picture in the foregoing manner, and sends the first picture to the server. Correspondingly, the server receives the first picture sent by the terminal, to obtain the first picture.

Optionally, an operation of obtaining the grayscale image of the first picture may include the following steps 3011 to 3013 for implementation. The steps may be as follows:

3031. Determine whether the first picture is a depth picture, and perform 3032 if the first picture is a depth picture, or perform 3033 if the first picture is not a depth picture.

A format of a depth picture is an RGBD format, and each pixel in the depth picture has a corresponding pixel value and depth value. The pixel value of the pixel includes an R-channel pixel value, a B-channel pixel value, and a G-channel pixel value. The depth value of the pixel is a distance between a point corresponding to the pixel on an object and a lens of a camera device.

In this step, a format of the first picture may be obtained. If the format is the RGBD format, it is determined that the first picture is a depth picture. If the format is not the RGBD format, it is determined that the first picture is not a depth picture.

3032. Obtain a grayscale value of each pixel based on a depth value of each pixel in the first picture, to obtain the grayscale image corresponding to the first picture, and end and return.

A grayscale value of each pixel in the grayscale image is an integer greater than or equal to 0 and less than or equal to 255.

In this step, a blank grayscale image is created, and a size of the grayscale image is equal to the size of the first picture, that is, a length and a width of the grayscale image are respectively equal to a length and a width of the first picture. A minimum depth value D1 and a maximum depth value D2 are obtained from depth values of all the pixels included in the first picture, and a grayscale value coefficient $X=255/(D2-D1)$ is calculated based on the minimum depth value D1 and the maximum depth value D2. For ease of description, each pixel in the first picture is referred to as a target pixel. A depth value d of the target pixel and a position of the target pixel in the first picture are read from the first picture, and a grayscale value $H=(d-D1)*X$ of the target pixel is calculated based on the depth value d of the target pixel, the minimum depth value D1, and the grayscale value coefficient X, where * is a multiplication operation. The grayscale image is filled with the grayscale value H of the target pixel based on the position of the target pixel, that is, the position of the grayscale image is filled with the grayscale value H of the target pixel. A grayscale value and a position of each other pixel in the first picture are obtained in a manner the same as the manner of obtaining the grayscale value of the target pixel, and the grayscale image is filled with the grayscale value of each other pixel based on the position of each other pixel, to obtain the grayscale image corresponding to the first picture.

3033. Obtain a grayscale value of each pixel based on a depth value of each pixel in the first picture, to obtain the grayscale image corresponding to the first picture, and end and return.

In this step, a blank grayscale image is created, and a size of the grayscale image is equal to the size of the first picture, that is, a length and a width of the grayscale image are respectively equal to a length and a width of the first picture. For ease of description, each pixel in the first picture is referred to as a target pixel. A pixel value of the target pixel and a position of the target pixel in the first picture are read from the first picture. A grayscale value of the target pixel is calculated based on the pixel value of the target pixel. The grayscale image is filled with the grayscale value of the target pixel based on the position of the target pixel, that is, the position of the grayscale image is filled with the grayscale value of the target pixel. A grayscale value and a position of each other pixel in the first picture are obtained in a manner the same as the manner of obtaining the grayscale value of the target pixel, and the grayscale image is filled with the grayscale value of each other pixel based on the position of each other pixel, to obtain the grayscale image corresponding to the first picture.

Optionally, there are a plurality of implementations of calculating the grayscale value of the target pixel based on the pixel value of the target pixel. For example, an implementation is listed in this embodiment, and the implementation may be as follows:

The pixel value of the target pixel includes an R-channel pixel value r, a G-channel pixel value g, and a B-channel pixel value b. The grayscale value H=r*s1+g*s2+b*s3 of the target pixel is calculated based on the R-channel pixel value r, the G-channel pixel value g, and the B-channel pixel value b, where s1 is a first coefficient corresponding to an R channel, s2 is a second coefficient corresponding to a G channel, and s3 is a third coefficient corresponding to a B channel. The first coefficient, the second coefficient, and the third coefficient are all preset values.

Optionally, an operation of obtaining the first image may be as follows: A blank first image is created, where a size of the first image is equal to the size of the first picture, that is, a length and a width of the first image are respectively equal to the length and the width of the first picture; and N parallel lines are generated in the first image, and a spacing between two adjacent lines does not exceed the spacing threshold.

Optionally, N lines that are parallel to each other and that are equally spaced may be generated in the first image, so that the N lines may be evenly distributed in the first image.

Optionally, each line in the first image may be parallel to a width direction of the first image, and a length of each line in the first image may be equal to the width of the first image. For example, referring to a first image shown in FIG. 3-2, the first image includes a plurality of lines that are parallel to each other and that are equally spaced.

N is an integer greater than 1. In implementation, N may be a value such as 250, 260, 270, 280, 290, or 300. Usually, a value of N may be in direct proportion to the length of the first picture. A longer length of the first picture may indicate a larger value of N, and a shorter length of the first picture may indicate a smaller value of N.

Step 302: Translate each line in the first image based on the grayscale image to obtain a second image, where the second image includes a contour of an image in the first picture.

An image included in the second image includes lines, and the image included in the second image is more abstract than the image included in the first picture. The first image includes an image coordinate system, and a position of a pixel in each line in the first image may be coordinates of the pixel in the image coordinate system.

This step may be implemented by using the following operations 3021 and 3022, which are respectively as follows:

3021. Convert each line in the first image into a curved line to obtain a third image.

For ease of description, any line in the first image is referred to as a first line. A random value of a pixel included in the first line is obtained based on a position of the pixel included in the first line by using a random function; a first offset value of the pixel included in the first line is obtained based on the random value of the pixel included in the first line and a spacing between the first line and a second line, where the second line is an adjacent line of the first line; and the pixel included in the first line is separately translated based on the first offset value of the pixel included in the first line, to obtain a curved line.

Optionally, the pixel included in the first line may be translated in a direction of a coordinate axis in the image coordinate system in the first image.

Optionally, the random function may be a Perlin noise function, a trigonometric function, a Perlin noise function, or the like. A position of any pixel in the first line in the first image may be obtained. The position may be coordinates (x1, y1) of the pixel. The coordinates (x1, y1) of the pixel are input into any random function of the Perlin noise function, the trigonometric function, and the Perlin noise function, so that the random function generates a random value p based on the coordinates (x1, y1). A first offset value p*d of the pixel is obtained based on the random value P and the spacing d between the first line and the second line, where * is a multiplication operation. The pixel is translated in a direction of a vertical coordinate axis in the image coordinate system in the first image based on the first offset value p*d of the pixel, and coordinates of the pixel after translation are (x1, y1+p*d). Alternatively, the pixel is translated in a direction of a horizontal coordinate axis in the image coordinate system in the first image based on the first offset value p*d of the pixel, and coordinates of the pixel after translation are (x1+p*d, y1).

A position of each pixel included in the first line is input into the random function, and a random value of each pixel generated by the random function may be different. In this way, an obtained first offset value of each pixel is also different. When each pixel in the first line is translated based on the first offset value of each pixel, the first line is translated into a curved line. For example, after the lines in the first image shown in FIG. 3-2 are translated, an effect diagram shown in FIG. 3-3 is obtained.

3022. Translate a pixel included in each line in the third image based on the grayscale image, to obtain the second image.

The size of the first picture is equal to the size of the first image, and therefore the size of the grayscale image of the first picture is also equal to a size of the third image.

Optionally, for ease of description, any line in the third image is referred to as a third line. A grayscale value of a pixel included in the third line is obtained from the grayscale image based on a position of the pixel included in the third line; a second offset value of the pixel included in the third line is obtained based on the grayscale value of the pixel included in the third line; and the pixel included in the third line is separately translated based on the second offset value of the pixel included in the third line. Each line in the third image is translated in the foregoing manner to obtain the second image.

Optionally, the position of the pixel included in the third line may be coordinates of the pixel in an image coordinate system in the third image. If the coordinates of the pixel are (x2, y2), a grayscale value located at the coordinates (x2, y2) is obtained from the grayscale image, and the grayscale value is determined as the grayscale value of the pixel.

Optionally, the pixel included in the third line may be translated in a direction of a coordinate axis in the image coordinate system in the third image.

Optionally, there are a plurality of implementations of obtaining the second offset value of the pixel based on the grayscale value of the pixel. In this embodiment of this application, only the following two implementations are listed, and other implementations are not listed one by one.

In a first implementation, the grayscale value of the pixel includes an R-channel grayscale value, a G-channel grayscale value, and a B-channel grayscale value, and the second offset value of the pixel is obtained based on the R-channel grayscale value, the G-channel grayscale value, and the B-channel grayscale value of the pixel by using the following first formula.

The first formula is $$F = \frac{H_R * z_1 + H_G * z_2 + H_B * z_3}{3 * z_4}.$$

In the first formula, F is the second offset value, $H_R$, $H_G$, and $H_B$ are respectively the R-channel grayscale value, the G-channel grayscale value, and the B-channel grayscale value, and $z_1$, $z_2$, $z_3$, and $z_4$ are all preset coefficients. For example, $z_1$, $z_2$, $z_3$, and $z_4$ may be respectively 3, 6, 1, and 8.

In a second implementation, a first grayscale value of a first pixel located at the coordinates (x2, y2) is determined in the grayscale image based on the coordinates (x2, y2) of the pixel, a second grayscale value of each second pixel adjacent to the first pixel is obtained from the grayscale image, a difference between the first grayscale value and each second grayscale value is calculated, an average value is calculated based on each calculated difference, and the average value is determined as the second offset value of the pixel.

It is assumed that the coordinates of the pixel are (x2, y2), and the second offset value of the pixel is F. The pixel is translated in a direction of a vertical coordinate axis in the image coordinate system in the third image based on the second offset value F of the pixel, and coordinates of the pixel after translation are (x2, y2+F). Alternatively, the pixel is translated in a direction of a horizontal coordinate axis in the image coordinate system in the third image based on the second offset value F of the pixel, and coordinates of the pixel after translation are (x2+F, y2).

It should be noted that the grayscale image includes information about the image in the first picture, and therefore the second image obtained after the pixel included in each line in the third image is translated based on the grayscale image includes the contour of the image in the first picture. For example, if the first picture includes a bird image, the second image obtained after the lines in the picture shown in FIG. 3-3 are translated includes a contour of the bird image, as shown in an effect diagram shown in FIG. 3-4. In the effect diagram of the second image shown in FIG. 3-4, the bird image includes lines.

Step 303: Set a pixel value of each pixel included in each line in the second image to obtain a second picture.

The first picture may be a color picture, or may be a non-color picture. When the first picture is a color picture, the pixel value of each pixel included in each line may be set based on the first picture. When the first picture is a non-color picture, the pixel value of the pixel included in each line may be set to a preset environmental color pixel value.

For an operation of setting the pixel value of each pixel included in each line based on the first picture, the pixel in the first picture is processed in a Gaussian blur processing manner to obtain the pixel value of each pixel included in each line. Therefore, the obtained second picture is more abstract and more artistic than the first picture. In implementation, the following steps 3021 to 3023 may be included, and are respectively as follows:

3021. Obtain a target image region from the first picture based on a target position of a target pixel, where the target pixel is a pixel included in any line in the second image, a position of a central pixel in the target image region is the target position, and a radius of the target image region is a first radius threshold.

The target position may be coordinates of the target pixel in an image coordinate system in the second image.

Optionally, a pixel located at the target position is found in the first picture as the central pixel, and an image region is obtained from the first picture as the target image region by using the central pixel as a center and using the first radius threshold as a radius.

3022. Calculate a target pixel value based on a pixel value of each pixel in the target image region.

A pixel value of a pixel includes an R-channel pixel value, a G-channel pixel value, and a B-channel pixel value.

This step may be as follows: A first average value of an R-channel pixel value, a G-channel pixel value, and a B-channel pixel value of each pixel in the target image region is calculated, and a first average value of each pixel in the target image region is calculated in the foregoing manner. A distance between each pixel and the target pixel is calculated based on a position of each pixel in the target image region and the target position, a weight value corresponding to each pixel is obtained based on the distance between each pixel and the target pixel, the first average value of each pixel is multiplied by the weight value of each pixel to obtain a first value of each pixel, a second average value is calculated based on the first value of each pixel, and the second average value is determined as the target pixel value.

Optionally, a correspondence between a distance range and a weight value may be prestored. In this way, a distance range within which the distance between each pixel and the target pixel falls is determined, a corresponding weight value is obtained from the correspondence between a distance range and a weight value based on the distance range, and the weight value is determined as the weight value of the pixel.

3023. Set a pixel value of the target pixel to the target pixel value.

Steps 3021 to 3023 are repeatedly performed, and the pixel value of each pixel included in each line in the second image is set to obtain the second picture.

In implementation, an operation of setting the pixel value of the pixel included in each line to the preset environmental color pixel value may include the following steps 3121 to 3123, which are respectively as follows:

3121. Obtain environmental factor information of a current environment, where the environmental factor information includes at least one of a geographical environment type, temperature information, and time information.

The geographical environment type may be a snow environment, a desert environment, a grassland environment, a sea environment, or the like. The temperature information may be a high temperature, warm, a low temperature, cold, or the like. The time information may be morning, noon, evening, or the like.

In this embodiment, an environmental color pixel value may be selected based on the current environment, so as to set a color of the second picture to a color that adapts to the current environment. Therefore, in this step, the environmental factor information of the current environment is obtained, so as to select, based on the environmental factor information in a subsequent step, an environmental color pixel value corresponding to the color that adapts to the current environment.

For example, when it is in the morning, a color of the line in the second image may be set to golden yellow; when it is at the noon, the second picture may be set to white; or when it is in the evening, the second picture may be set to blue. Alternatively, when the current environment is the snow environment, the second picture may be set to white; when the current environment is the desert environment, the second picture may be set to brownish-yellow; when the current environment is the grassland environment, the second picture may be set to grass green; or when the current environment is the sea environment, the second picture may be set to aqua blue.

In this step, when this embodiment of this application is executed by the terminal, for the geographical environment type, the terminal may locate a current position, and find an environment type of the current position from a server based on the current position.

For the temperature information, a temperature value range corresponding to the high temperature, a temperature value range corresponding to the low temperature, a temperature value range corresponding to warm, and a temperature value range corresponding to cold are predefined. In this way, when the temperature information is obtained, a current temperature value may be obtained, a temperature value range within which the current temperature value falls is determined, and temperature information corresponding to the temperature value range is obtained. The current temperature value at the current position of the terminal may be queried from a network. Alternatively, when the terminal includes a temperature measurement sensor, the current temperature value may be measured by using the temperature measurement sensor.

For the time information, a time range corresponding to the morning, a time range corresponding to the noon, and a time range corresponding to the evening are predefined. When the time information is obtained, a current time may be obtained, a time range within which the current time falls is determined, and time information corresponding to the time range is obtained.

In this step, when this embodiment of this application is executed by the server, the terminal may send the located current position to the server. In this way, the server obtains the geographical environment type of the current environment of the terminal based on the current position of the terminal, and may further query the current temperature value from the network based on the current position, and then obtain the temperature information based on the current temperature value. The server may obtain the current time, and obtain the time information based on the current time.

3122. Obtain, based on the environmental factor information of the current environment, an environmental color pixel value corresponding to the current environment from a correspondence between environmental factor information and an environmental color pixel value.

Any record in the correspondence between environmental factor information and an environmental color pixel value includes an environmental color pixel value and environmental factor information corresponding to the environmental color pixel value, and the environmental factor information corresponding to the environmental color pixel value may include at least one of a geographical environment type, temperature information, and time information. In other words, the environmental factor information corresponding to the environmental color pixel value may be the geographical environment type, the temperature information, or the time information, or the environmental factor information corresponding to the environmental color pixel value may include the geographical environment type and the temperature information, or include the temperature information and the time information, or include the geographical environment type and the time information, or include the geographical environment type, the temperature information, and the time information.

3123. Set the pixel value of each pixel included in each line in the second image to the environmental color pixel value corresponding to the current environment, to obtain the second picture.

Figures 3, 4:
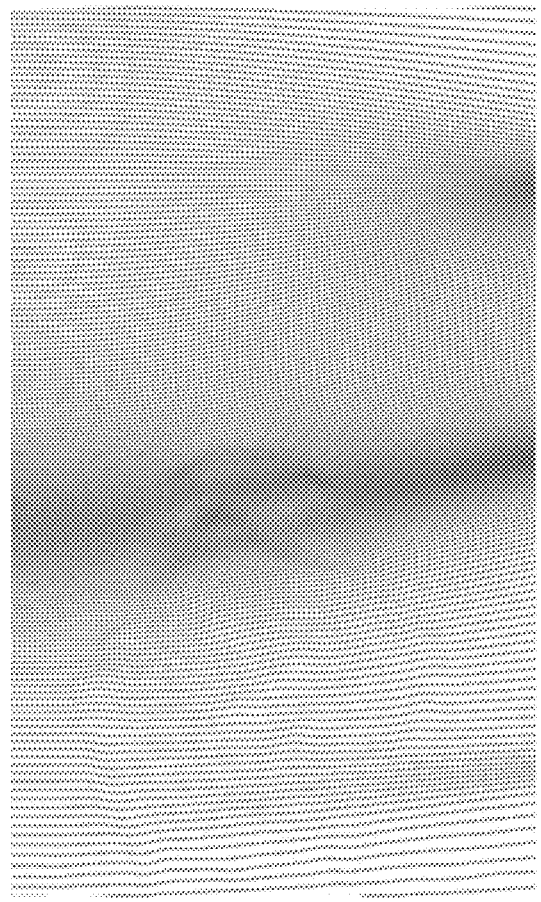
Figures 3, 4, 5:
Figures 1, 4:
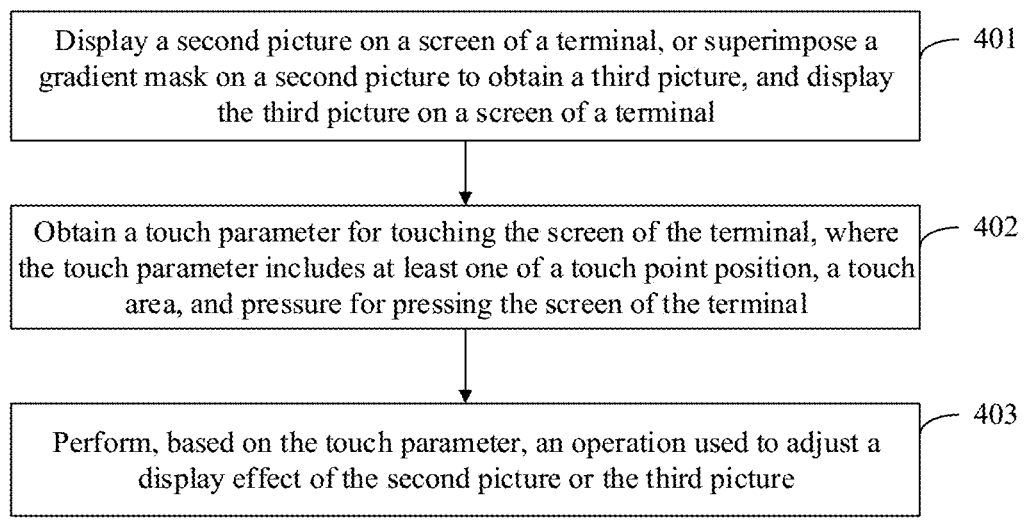
Figures 2, 4:
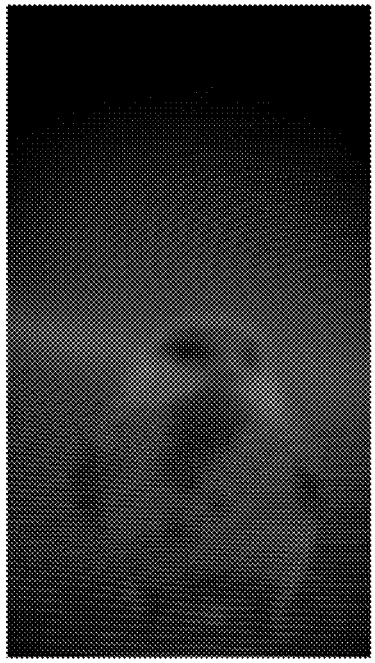
Figures 3, 4:
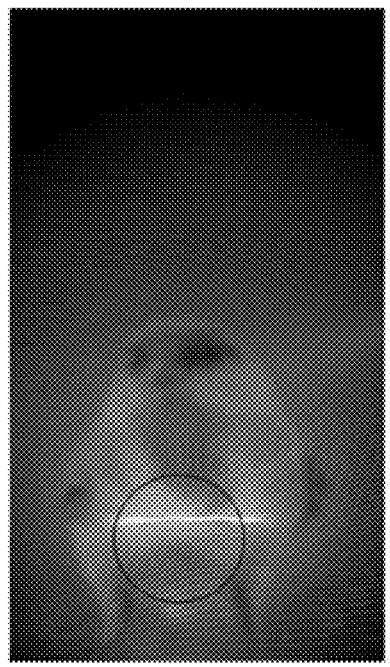
Figure 5:
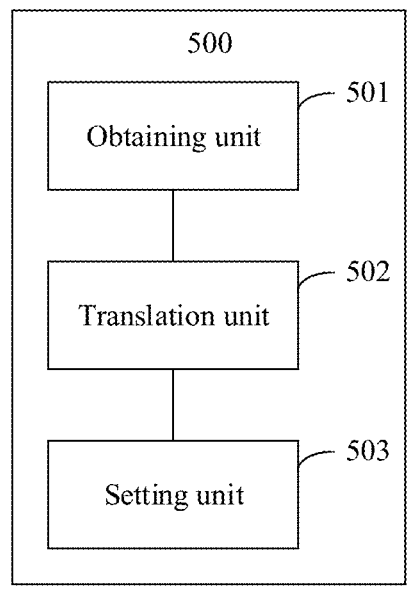

For example, after a pixel value of a pixel included in each line in the picture shown in FIG. 3-4 is set in the foregoing two manners, a display effect of the second picture shown in FIG. 3-5 is obtained.

Optionally, if this embodiment of this application is executed by the terminal, the terminal may display the second picture based on an embodiment shown in FIG. 4-1. If this embodiment of this application is executed by the server, the server may send the second picture to the terminal, so that the terminal displays the second picture based on an embodiment shown in FIG. 4-1.

Optionally, when the terminal needs to display a picture, the second picture may be obtained based on steps 301 to 303, so that the terminal displays a different picture each time. Alternatively, the second picture is periodically obtained, so that the terminal displays a different picture in each period.

In this embodiment of this application, the grayscale image corresponding to the first picture and the first image are obtained, each line in the first image is translated based on the grayscale image to obtain the second image, where the second image includes the contour of the image in the first picture, and the pixel value of each pixel included in each line in the second image is set in the second image to obtain the second picture. In this way, the obtained second picture may be displayed after the screen of the terminal turns off. After the screen of the terminal turns off, the second picture is generated based on the original first picture. Therefore, different pictures used for display in the screen off mode may be obtained on different terminals, to relieve monotony of unvarying preset pictures displayed.

Referring to FIG. 4-1, an embodiment of this application provides a method for displaying a picture. The picture may be the second picture obtained by using the embodiment shown in FIG. 3-1. The method may be used in the system shown in FIG. 1, may be performed by a terminal, and includes the following steps.

Step 401: Display the second picture on a screen of the terminal, or superimpose a gradient mask on the second picture to obtain a third picture, and display the third picture on a screen of the terminal.

The second picture may be obtained by the terminal by using the embodiment shown in FIG. 3-1. Alternatively, the second picture is sent by a server to the terminal, and the server sends the second picture to the terminal after obtaining the second picture by using the embodiment shown in FIG. 3-1.

Optionally, after the terminal enters a screen off mode, the second picture may be displayed on the screen of the terminal. Alternatively, the gradient mask is superimposed on the second picture to obtain the third picture, and the third picture is displayed on the screen of the terminal. In implementation, the second picture may be displayed in the following several cases, which are respectively as follows:

In a first case, when the terminal just enters the screen off mode, the second picture is displayed on the screen of the terminal. Alternatively, the gradient mask is superimposed on the second picture to obtain the third picture, and the third picture is displayed on the screen of the terminal.

Optionally, when the terminal just enters the screen off mode, duration for displaying the second picture or the third picture on the screen of the terminal may be equal to a preset duration threshold.

In a second case, after the terminal enters the screen off mode, when it is detected that the terminal is operated by a user, the second picture is displayed on the screen of the terminal. Alternatively, the gradient mask is superimposed on the second picture to obtain the third picture, and the third picture is displayed on the screen of the terminal.

Usually, when the user picks up the terminal to view the screen of the terminal or operate the terminal, the terminal jitters accordingly. For example, the user picks up the terminal from a carry-on bag to view the screen of the terminal, or the user picks up the terminal from a pocket to view the screen of the terminal. In this case, it may be detected that the terminal jitters, and it is further determined that the terminal is operated by the user. The user views the screen of the terminal when operating the terminal, and therefore the second picture or the third picture may be displayed for the user to view.

Optionally, the terminal includes at least one motion sensor of a gyroscope, a gravity sensor, an acceleration sensor, and the like, and a motion parameter of the terminal is collected by using the motion sensor. When the motion parameter exceeds a preset parameter threshold, it is determined that the terminal jitters.

In a third case, after the terminal enters the screen off mode, when it is detected that a distance between an obstacle in front of the screen of the terminal and the screen of the terminal is less than a first distance threshold, the second picture is displayed on the screen of the terminal. Alternatively, the gradient mask is superimposed on the second picture to obtain the third picture, and the third picture is displayed on the screen of the terminal.

In the third case, the terminal may be a terminal device such as a television set or a display. The terminal is usually fixed at a specific position, and the user usually walks towards the terminal. When the user approaches the terminal, that is, a distance between the user and the screen of the terminal is less than the first distance threshold, the second picture or the third picture is displayed, so that the user views the displayed second picture or third picture.

Optionally, the terminal may include a distance sensor or a proximity sensor. The distance sensor or the proximity sensor may detect whether there is an obstacle in front of the screen of the terminal and a distance between the obstacle and the screen of the terminal.

Optionally, the gradient mask includes a display region and a non-display region. Transparency of the non-display region is less than or equal to a transparency threshold, a central position of the display region is a preset position on the screen of the terminal, a radius of the display region is a second radius threshold, and transparency of a region that is in the display region and that is farther away from the central position is lower.

The transparency threshold may be a relatively small transparency value such as 0, 1%, or 2%. In this way, the second picture located below the non-display region cannot be displayed.

When the display region is a regular graphic region, the central position of the display region is a geometric central position of the display region. For example, when the display region is a circular region, the central position of the display region is a geometric central position of the display region. When the display region is an irregular graphic region, the central position of the display region is a gravity position of the display region.

The preset position on the screen of the terminal is a predefined position. For example, the preset position may be a position that is right below the central position of the screen of the terminal and whose distance from the central position is a preset value, or may be a position that is right above the central position of the screen of the terminal and whose distance from the central position is a preset value. If the preset value is 200 pixels, the preset position is a position that is right below the central position of the screen of the terminal and that is 200 pixels away from the central position, or the preset position is a position that is right above the central position of the screen of the terminal and that is 200 pixels away from the central position.

In this step, the gradient mask may be superimposed on the second picture by using the following steps 4021 and 4022, which may be as follows:

4021. Superimpose a mask on the second picture, where transparency of the mask is less than or equal to the transparency threshold.

The transparency of the mask is relatively low, and is less than or equal to the transparency threshold, and therefore the mask may block display of the second picture.

Optionally, a color of the mask may be black. The mask may be a layer.

4022. Set a display region in the mask to form the gradient mask, so as to obtain the third picture, where a region other than the display region in the gradient mask is the non-display region.

First, the preset position on the screen of the terminal may be determined. For example, the position that is right below the central position of the screen of the terminal and whose distance from the central position is the preset value may be found and used as the preset position, or the position that is right above the central position of the screen of the terminal and whose distance from the central position is the preset value may be found and used as the preset position.

Then, in the mask, a circular region is determined as the display region by using the preset position as a center and using the second radius threshold as a radius.

The second radius threshold includes a first radius and a second radius, and the first radius is greater than the second radius, or the first radius is less than the second radius. If the screen of the terminal is currently placed in portrait orientation, a circular region is determined as the display region in the mask by using the preset position as a center and by using the first radius. If the screen of the terminal is currently placed in landscape orientation, a circular region is determined as the display region in the mask by using the preset position as a center and by using the second radius.

Finally, it is set in the display region that transparency of a region that is farther away from the central position is lower. The transparency of the central position of the display region may be 100%, and transparency of an edge of the display region may be a preset transparency threshold.

In this step, the gradient mask is superimposed on the second picture. For example, the gradient mask is added to the picture shown in FIG. 3-5, and an obtained effect diagram of the third picture is shown in FIG. 4-2. The gradient mask is added, so that gradient display may be implemented. Therefore, a display effect can be improved, and user experience can be improved.

To improve the display effect and improve user experience, when a finger of the user touches the screen of the terminal, brightness of displaying the second picture or the third picture may be adjusted, and/or an area of the display region in the gradient mask may be adjusted. Detailed implementation is as follows:

Step 402: Obtain a touch parameter for touching the screen of the terminal, where the touch parameter includes at least one of a touch point position, a touch area, and pressure for pressing the screen of the terminal.

The screen of the terminal may be a touchscreen. When the finger of the user touches the screen of the terminal, a touch event generated on the touchscreen may be detected, and the touch area in which the screen of the terminal is touched and/or the pressure for pressing the screen of the terminal may be obtained. The touch point position may be a central position of the touch area.

Step 403: Perform, based on the touch parameter, an operation used to adjust a display effect of the second picture or the third picture.

The operation of adjusting the display effect of the second picture may include: translating a pixel included in a line in the second picture, and adjusting brightness of the pixel included in the line in the second picture. The operation of adjusting the display effect of the third picture may include: translating a pixel included in a line in the third picture, adjusting brightness of the pixel included in the line in the third picture, and/or adjusting the area of the display region included in the gradient mask, and so on.

Optionally, when the touch parameter includes the touch point position, the pixel included in the line in the second picture or the third picture may be translated. A detailed translation process may include the following operations 41a to 43a, which are respectively as follows:

41a. Obtain a first pixel set and a second pixel set from pixels included in lines in the second picture or the third picture, where the first pixel set includes a first pixel whose distance from the touch point position is less than or equal to a first distance threshold, and the second pixel set includes a second pixel whose distance from the touch point position is greater than the first distance threshold.

Optionally, a distance between a pixel included in each line in the second picture or the third picture and the touch point position may be calculated based on a position of the pixel included in each line and the touch point position, a pixel whose distance from the touch point position is less than or equal to the first distance threshold is used as the first pixel to form the first pixel set, and a pixel whose distance from the touch point position is greater than the first distance threshold is used as the second pixel to form the second pixel set.

42a. Obtain a third offset value of each first pixel in the first pixel set and a fourth offset value of each second pixel in the second pixel set, where the third offset value of each first pixel is greater than the fourth offset value of each second pixel, or the third offset value of each first pixel is less than the fourth offset value of each second pixel.

Optionally, a first piecewise function and a second piecewise function are preset, and curve change amplitude corresponding to the first piecewise function is greater than curve change amplitude corresponding to the second piecewise function. For example, the first piecewise function may be a sinusoidal function, and the second piecewise function may be a normal distribution function.

In this step, the third offset value of each first pixel may be calculated by using the first piecewise function based on a distance between each first pixel in the first pixel set and the touch point position, and the fourth offset value of each second pixel may be calculated by using the second piecewise function based on a distance between each second pixel in the second pixel set and the touch point position. The third offset value of each first pixel is greater than the fourth offset value of each second pixel.

Alternatively, the third offset value of each first pixel may be calculated by using the second piecewise function based on a distance between each first pixel in the first pixel set and the touch point position, and the fourth offset value of each second pixel may be calculated by using the first piecewise function based on a distance between each second pixel in the second pixel set and the touch point position. The third offset value of each first pixel is less than the fourth offset value of each second pixel.

43a. Separately translate each first pixel based on the third offset value of each first pixel and a relative position between each first pixel and the touch point position, and separately translate each second pixel based on the fourth offset value of each second pixel and a relative position between each second pixel and the touch point position.

Optionally, in this step, the pixel in the second picture or the third picture may be translated in a direction away from the touch point position. An implementation process may be as follows:

For any first pixel, if the first pixel is located above the touch point position, the first pixel is translated upwards based on a third offset value of the first pixel; or if the first pixel is located below the touch point position, the first pixel is translated downwards based on a third offset value of the first pixel. For any second pixel, if the second pixel is located above the touch point position, the second pixel is translated upwards based on a fourth offset value of the second pixel; or if the second pixel is located below the touch point position, the first pixel is translated downwards based on a third offset value of the first pixel.

Optionally, in this step, the pixel in the second picture or the third picture may be translated in a direction close to the touch point position. An implementation process may be as follows:

For any first pixel, if the first pixel is located above the touch point position, the first pixel is translated downwards based on a third offset value of the first pixel; or if the first pixel is located below the touch point position, the first pixel is translated upwards based on a third offset value of the first pixel. For any second pixel, if the second pixel is located above the touch point position, the second pixel is translated downwards based on a fourth offset value of the second pixel; or if the second pixel is located below the touch point position, the first pixel is translated upwards based on a third offset value of the first pixel.

Optionally, when the touch parameter includes the touch point position, the brightness of the pixel included in the line in the second picture or the third picture may be adjusted. A detailed adjustment process may include the following operations 41b to 43b, which are respectively as follows:

41b. Obtain a distance between the pixel included in each line in the second picture or the third picture and the touch point position.

Optionally, the distance between the pixel included in each line and the touch point position may be calculated based on the position of the pixel included in each line in the second picture or the third picture and the touch point position.

42b. Obtain a first brightness adjustment value of the pixel included in each line in the second picture based on the distance between the pixel included in each line in the second picture and the touch point position; or obtain a first brightness adjustment value of the pixel included in each line in the third picture based on the distance between the pixel included in each line in the third picture and the touch point position.

Optionally, a first brightness adjustment value of any pixel in any line in the second picture or the third picture may be k1/d, where d is a distance between the pixel and the touch point position, and k1 is a first preset coefficient. In this way, a longer distance between the pixel and the touch point position indicates a smaller first brightness adjustment value of the pixel, and a shorter distance between the pixel and the touch point position indicates a larger first brightness adjustment value of the pixel.

43b. Adjust, based on the first brightness adjustment value of the pixel included in each line in the second picture, the brightness of displaying the pixel included in each line in the second picture; or adjust, based on the first brightness adjustment value of the pixel included in each line in the third picture, the brightness of displaying the pixel included in each line in the third picture.

Optionally, a height value of any pixel included in each line in the second picture or the third picture may be increased by a first brightness adjustment value of the pixel. A pixel closer to the touch point position has a first brightness adjustment value with higher change amplitude. Therefore, when the finger of the user swipes the displayed second picture or third picture, a pixel closer to the touch point position has a larger first brightness adjustment value and a pixel farther away from the touch point position has a smaller first brightness adjustment value. Therefore, a line with higher brightness may be displayed at a position swiped by the finger, as shown in an effect diagram shown in FIG. 4-3, thereby improving the display effect.

Optionally, when the touch parameter includes the pressure for pressing the screen of the terminal, the brightness of the pixel included in the line in the second picture or the third picture may be adjusted. A detailed adjustment process may be as follows:

A second brightness adjustment value is obtained based on the pressure for pressing the screen of the terminal, and the brightness of displaying the pixel include in each line in the second picture or the third picture is adjusted based on the second brightness adjustment value.

Optionally, the second brightness adjustment value may be k2*w, where k2 is a second preset coefficient, and w is the pressure for pressing the screen of the terminal or a level of the pressure for pressing the screen of the terminal.

A correspondence between a pressure range and a level is established in advance. Therefore, the level of the pressure for pressing the screen of the terminal may be obtained in the following manner: A pressure range within which the pressure for pressing the screen of the terminal falls is determined, and the level of the pressure for pressing the screen of the terminal is obtained from the correspondence between a pressure range and a level based on the determined pressure range.

Optionally, when the touch parameter includes the touch area, the area of the display region included in the gradient mask may be adjusted. A detailed adjustment process may be as follows: The radius of the display region included in the gradient mask is obtained based on the touch area, and the area of the display region included in the gradient mask is adjusted based on the radius.

Optionally, when the touch area S is greater than a preset contact area S0, the radius R of the display region included in the gradient mask is equal to (R0*S)/S0, where R0 is the second radius threshold.

Optionally, the terminal includes at least one sensor. To improve the display effect and improve user experience, data collected by the at least one sensor in the terminal may be obtained, and brightness of displaying the second picture or the third picture by the terminal and/or a size of the area of the display region in the gradient mask may be adjusted based on the collected data.

The terminal may include at least one of an ultraviolet sensor, a heart rate/blood oxygen sensor, a sound sensor (microphone), a distance sensor, a barometric pressure sensor, a magnetic field sensor, and the like.

Optionally, when the terminal includes the ultraviolet sensor, an ultraviolet index a collected by the ultraviolet sensor is obtained, a third brightness adjustment value k3*a is calculated based on a third preset coefficient k3 and the ultraviolet index a, and the brightness of displaying the second picture or the third picture by the terminal is increased or decreased by the third brightness adjustment value; and/or a first radius adjustment value r1*a is calculated based on a first radius coefficient r1 and the ultraviolet index a, and the radius of the display region in the gradient mask is increased or decreased by the first radius adjustment value.

Optionally, when the terminal includes the heart rate/blood oxygen sensor, a heart rate value b and a blood oxygen value c collected by the heart rate/blood oxygen sensor are obtained, a fourth brightness adjustment value (k4*b)/c is calculated based on a fourth preset coefficient k4, the heart rate value b, and the blood oxygen value c, and the brightness of displaying the second picture or the third picture by the terminal is increased or decreased by the fourth brightness adjustment value; and/or a second radius adjustment value (r2*b)/c is calculated based on a second radius coefficient r2, the heart rate value b, and the blood oxygen value c, and the radius of the display region in the gradient mask is increased or decreased by the second radius adjustment value.

Optionally, when the terminal includes the barometric pressure sensor or the sound sensor (microphone), a gas flow rate v collected by the barometric pressure sensor or the sound sensor (microphone) is obtained, a fifth brightness adjustment value k5*v is calculated based on a fifth preset coefficient k5 and the gas flow rate v, and the brightness of displaying the second picture or the third picture by the terminal is increased or decreased by the fifth brightness adjustment value; and/or a third radius adjustment value r3*v is calculated based on a third radius coefficient r3 and the gas flow rate v, and the radius of the display region in the gradient mask is increased or decreased by the third radius adjustment value.

The gas flow rate v collected by the barometric pressure sensor or the sound sensor (microphone) may be generated when the user blows at the terminal. In this way, when the user blows at a higher flow rate, the second picture is displayed with higher brightness, or the third picture is displayed with higher brightness and/or the display region has a larger area. Alternatively, when the user blows at a higher flow rate, the second picture is displayed with lower brightness, or the third picture is displayed with lower brightness and/or the display region has a smaller area, thereby improving the display effect and user experience.

Optionally, when the terminal includes the sound sensor (microphone), a volume value e collected by the sound sensor (microphone) is obtained, a sixth brightness adjustment value $k6*e$ is calculated based on a sixth preset coefficient k6 and the volume value e, and the brightness of displaying the second picture or the third picture by the terminal is increased or decreased by the sixth brightness adjustment value; and/or a fourth radius adjustment value $r4*e$ is calculated based on a fourth radius coefficient r4 and the volume value e, and the radius of the display region in the gradient mask is increased or decreased by the fourth radius adjustment value.

Optionally, when the terminal includes a light sensor, a light intensity value f collected by the light sensor is obtained, a seventh brightness adjustment value $k7*f$ is calculated based on a seventh preset coefficient k7 and the light intensity value f, and the brightness of displaying the second picture or the third picture by the terminal is increased or decreased by the seventh brightness adjustment value; and/or a fifth radius adjustment value $r5*f$ is calculated based on a fifth radius coefficient r5 and the light intensity value f, and the radius of the display region in the gradient mask is increased or decreased by the fifth radius adjustment value.

Optionally, when the terminal includes the barometric pressure sensor, a barometric pressure value f collected by the barometric pressure sensor is obtained, a seventh brightness adjustment value $k7*f$ is calculated based on a seventh preset coefficient k7 and the barometric pressure value f, and the brightness of displaying the second picture or the third picture by the terminal is increased or decreased by the seventh brightness adjustment value; and/or a sixth radius adjustment value $r6*f$ is calculated based on a sixth radius coefficient r6 and the barometric pressure value f, and the radius of the display region in the gradient mask is increased or decreased by the sixth radius adjustment value.

Optionally, when the terminal includes the magnetic field sensor, a magnetic field strength value g collected by the magnetic field sensor is obtained, an eighth brightness adjustment value $k8*g$ is calculated based on an eighth preset coefficient k8 and the magnetic field strength value g, and the brightness of displaying the second picture or the third picture by the terminal is increased or decreased by the eighth brightness adjustment value; and/or a sixth radius adjustment value $r6*g$ is calculated based on a sixth radius coefficient r6 and the magnetic field strength value g, and the radius of the display region in the gradient mask is increased or decreased by the sixth radius adjustment value.

Optionally, when the terminal includes the distance sensor, a distance h that is between an obstacle in front of the screen of the terminal and the screen of the terminal and that is collected by the distance sensor is obtained, a ninth brightness adjustment value $k9*h$ is calculated based on a ninth preset coefficient k9 and the distance h, and the brightness of displaying the second picture or the third picture by the terminal is increased or decreased by the ninth brightness adjustment value; and/or a seventh radius adjustment value $r7*h$ is calculated based on a seventh radius coefficient r7 and the distance h, and the radius of the display region in the gradient mask is increased or decreased by the seventh radius adjustment value.

The finger of the user may be far away from the screen of the terminal or close to the screen of the terminal, and the distance h that is between the obstacle in front of the screen of the terminal and the screen of the terminal and that is collected by the distance sensor may be a distance between the finger of the user and the screen of the terminal. In this way, when the finger of the user is close to the screen of the terminal, the second picture is displayed with higher brightness, or the third picture is displayed with higher brightness and/or the display region has a larger area. Alternatively, when the finger of the user is far away from the screen of the terminal, the second picture is displayed with lower brightness, or the third picture is displayed with lower brightness and/or the display region has a smaller area.

Optionally, the user usually wears a wearable device, and the wearable device may collect user vital sign data. To improve the display effect and improve user experience, the user vital sign data collected by the wearable device may be obtained, and brightness of displaying the second picture or the third picture by the terminal may be adjusted based on the user vital sign data.

Optionally, the sign data may include a heart rate value b and a blood oxygen value c, or may include a blood pressure value and the like.

When the sign data includes the heart rate value b and the blood oxygen value c, a fourth brightness adjustment value $(k4*b)/c$ may be calculated based on a fourth preset coefficient k4, the heart rate value b, and the blood oxygen value c, and the brightness of displaying the second picture or the third picture by the terminal may be increased or decreased by the fourth brightness adjustment value.

When the sign data includes the blood pressure value p, a tenth brightness adjustment value $k10*p$ may be calculated based on a tenth preset coefficient k10 and the distance p, and the brightness of displaying the second picture or the third picture by the terminal may be increased or decreased by the tenth brightness adjustment value.

Optionally, after the second picture or the third picture is displayed on the screen of the terminal, when duration for displaying the second picture or the third picture reaches a duration threshold, a fourth picture taken by a front-facing camera of the terminal is obtained. When the fourth picture includes a human eye image, the second picture or the third picture is displayed in a first time period. The first time period is a time period that is closest to a current time and whose duration is preset duration.

When the duration for displaying the second picture or the third picture reaches the duration threshold, if the fourth picture taken by the front-facing camera of the terminal includes the human eye image, it indicates that the user is still viewing the screen of the terminal currently. Therefore, the second picture or the third picture continues to be displayed in the preset duration, to improve user experience.

Optionally, after the fourth picture taken by the front-facing camera of the terminal is obtained, when the fourth picture does not include a human eye image, and it is detected that the terminal is operated by the user or that the distance between the obstacle in front of the screen of the terminal and the screen of the terminal is less than a second distance threshold, the second picture or the third picture is displayed in the first time period.

When the duration for displaying the second picture or the third picture reaches the duration threshold, if the fourth picture taken by the front-facing camera of the terminal does not include a human eye image, it indicates that the user may not be viewing the screen of the terminal currently. However, it is still determined whether the terminal is operated by the user or whether the distance between the obstacle in front of the screen of the terminal and the screen of the terminal is less than the second distance threshold. If it is determined that the terminal is operated by the user, it indicates that the user may view the screen of the terminal when operating the terminal. Therefore, the second picture or the third picture may continue to be displayed in the preset duration, to improve user experience. Alternatively, if it is determined that the distance between the obstacle in front of the screen of the terminal and the screen of the terminal is less than the second distance threshold, it indicates that the user may be approaching the screen of the terminal and may view the screen of the terminal when approaching. Therefore, the second picture or the third picture may continue to be displayed in the preset duration, to improve user experience.

The terminal may further include a sensor such as a proximity sensor, a distance sensor, an acceleration sensor, and/or a gyroscope. Whether the terminal jitters may be detected by using a sensor such as the acceleration sensor and/or the gyroscope in the terminal. If the terminal jitters, it is determined that the terminal is operated by the user. The distance between the obstacle in front of the screen of the terminal and the screen of the terminal may be obtained by using the proximity sensor and/or the distance sensor in the terminal.

Optionally, the screen of the terminal may be further detected based on the gyroscope or the acceleration sensor in the terminal. When it is detected that the screen of the terminal is switched from landscape orientation to portrait orientation, the radius of the display region in the gradient mask is set to the first radius. When it is detected that the screen of the terminal is switched from the portrait orientation to the landscape orientation, the radius of the display region in the gradient mask is set to the second radius. The first radius is less than the second radius, or the first radius is greater than the second radius.

Optionally, in this embodiment, a picture other than the second picture or the third picture may be also displayed in the manner of displaying the second picture or the third picture. The another picture includes a contour of an image generated based on a line.

In this embodiment of this application, when the user touches the displayed second picture or the third picture, the touch parameter for touching the screen of the terminal is obtained, and the operation used to adjust the display effect of the second picture or the third picture is performed based on the touch parameter, to improve the effect of displaying the second picture or the third picture.

Referring to FIG. 5, an embodiment of this application provides a picture obtaining apparatus 500. The apparatus 500 may be the terminal, a part of the terminal, a server, or a part of the server in any one of the foregoing embodiments, and includes:

an obtaining unit 501, configured to obtain a grayscale image corresponding to a first picture and a first image, where a size of the first picture is equal to a size of the first image, the first image includes N parallel lines, a spacing between two adjacent lines does not exceed a spacing threshold, and N is an integer greater than 1;

a translation unit 502, configured to translate a pixel included in each line in the first image based on the grayscale image to obtain a second image, where the second image includes a contour of an image in the first picture; and a setting unit 503, configured to set a pixel value of each pixel included in each line in the second image, to obtain a second picture.

Optionally, the translation unit 502 is configured to:
convert each line in the first image into a curved line to obtain a third image; and
translate a pixel included in each line in the third image based on the grayscale image, to obtain the second image.

Optionally, the translation unit 502 is configured to:
obtain a random value of a pixel included in a first line based on a position of the pixel included in the first line by using a random function, where the first line is any line in the first image;
obtain a first offset value of the pixel included in the first line based on the random value of the pixel included in the first line and a spacing between the first line and a second line, where the second line is an adjacent line of the first line; and
separately translate the pixel included in the first line based on the first offset value of the pixel included in the first line, to obtain a curved line.

Optionally, the translation unit 502 is configured to:
obtain a grayscale value of a pixel included in a third line from the grayscale image based on a position of the pixel included in the third line, where the third line is any line in the third image;
obtain a second offset value of the pixel included in the third line based on the grayscale value of the pixel included in the third line; and
separately translate the pixel included in the third line based on the second offset value of the pixel included in the third line.

Optionally, the setting unit 503 is configured to:
obtain a target image region from the first picture based on a target position of a target pixel, where the target pixel is a pixel included in any line in the second image, a position of a central pixel in the target image region is the target position, and a radius of the target image region is a first radius threshold;
calculate a target pixel value based on a pixel value of each pixel in the target image region; and
set a pixel value of the target pixel to the target pixel value.

Optionally, the setting unit 503 is configured to:
obtain environmental factor information of a current environment, where the environmental factor information includes at least one of a geographical environment type, temperature information, and time information;
obtain, based on the environmental factor information of the current environment, an environmental color pixel value corresponding to the current environment from a correspondence between environmental factor information and an environmental color pixel value; and
set the pixel value of each pixel included in each line in the second image to the environmental color pixel value corresponding to the current environment, to obtain the second picture.

Optionally, the apparatus 500 further includes:
a display unit, configured to display the second picture on a screen of a terminal; or
the apparatus 500 further includes:
a superimposing unit, configured to superimpose a gradient mask on the second picture to obtain a third picture, where the gradient mask includes a display region and a non-display region, transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower; and
a display unit, configured to display the third picture on the screen of the terminal.

Optionally, the apparatus 500 further includes:

a processing unit, configured to obtain a touch parameter for touching the screen of the terminal, where the touch parameter includes at least one of a touch point position, a touch area, and pressure for pressing the screen of the terminal; and perform, based on the touch parameter, an operation used to adjust a display effect of the third picture.

Optionally, the processing unit is configured to:

when the touch parameter includes the touch point position, obtain a first pixel set and a second pixel set from pixels included in lines in the third picture, where the first pixel set includes a first pixel whose distance from the touch point position is less than or equal to a first distance threshold, and the second pixel set includes a second pixel whose distance from the touch point position is greater than the first distance threshold;

obtain a third offset value of each first pixel in the first pixel set and a fourth offset value of each second pixel in the second pixel set, where the third offset value of each first pixel is greater than the fourth offset value of each second pixel, or the third offset value of each first pixel is less than the fourth offset value of each second pixel; and separately translate each first pixel based on the third offset value of each first pixel and a relative position between each first pixel and the touch point position, and separately translate each second pixel based on the fourth offset value of each second pixel and a relative position between each second pixel and the touch point position.

Optionally, the processing unit is configured to:

when the touch parameter includes the touch point position, obtain a distance between the pixel included in each line in the third picture and the touch point position;

obtain a first brightness adjustment value of the pixel included in each line in the third picture based on the distance between the pixel included in each line in the third picture and the touch point position; and adjust, based on the first brightness adjustment value of the pixel included in each line in the third picture, the brightness of displaying the pixel included in each line in the third picture.

Optionally, the processing unit is configured to:

when the touch parameter includes the pressure for pressing the screen of the terminal, obtain a second brightness adjustment value based on the pressure for pressing the screen of the terminal, and adjust, based on the second brightness adjustment value, the brightness of displaying the pixel included in each line in the third picture; and/or when the touch parameter includes the touch area, obtain the radius of the display region included in the gradient mask based on the touch area, and adjust an area of the display region included in the gradient mask based on the radius.

Optionally, the processing unit is further configured to:

obtain data collected by at least one sensor in the terminal, obtain a third brightness adjustment value based on the collected data, and adjust, based on the third brightness adjustment value, the brightness of displaying the pixel included in each line in the third picture; or obtain user vital sign data collected by a wearable device, obtain a fourth brightness adjustment value based on the user vital sign data, and adjust, based on the fourth brightness adjustment value, the brightness of displaying the pixel included in each line in the third picture.

Optionally, the processing unit is further configured to:

when duration for displaying the third picture reaches a duration threshold, obtain a fourth picture taken by a front-facing camera of the terminal; and when the fourth picture includes a human eye image, display the third picture in a first time period, where the first time period is a time period that is closest to a current time and whose duration is preset duration.

Optionally, the processing unit is further configured to:

when the fourth picture does not include a human eye image, and it is detected that the terminal is operated by a user or that a distance between an obstacle in front of the screen of the terminal and the screen of the terminal is less than a second distance threshold, display the third picture in the first time period.

In this embodiment of this application, the grayscale image corresponding to the first picture and the first image are obtained, each line in the first image is translated based on the grayscale image to obtain the second image, where the second image includes the contour of the image in the first picture, and the pixel value of each pixel included in each line in the second image is set in the second image to obtain the third picture. In this way, the obtained third picture may be displayed after the screen of the terminal turns off. After the screen of the terminal turns off, the third picture is generated based on the original first picture. Therefore, different pictures used for display in a screen-off mode may be obtained on different terminals, to relieve monotony of unvarying preset pictures displayed.

Figure 6:
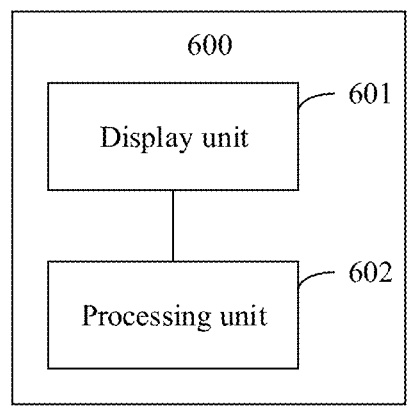
FIG. 6 is a schematic structural diagram of a picture processing apparatus according to an embodiment of this application.

Referring to FIG. 6, an embodiment of this application provides a picture processing apparatus 600. The apparatus 600 may be the terminal, a part of the terminal, a server, or a part of the server in any one of the foregoing embodiments, and includes:

a display unit 601, configured to display a target picture, where the target picture includes a contour of an image generated based on a line; and a processing unit, configured to obtain a touch parameter for touching a screen of a terminal, where the touch parameter includes at least one of a touch point position, a touch area, and pressure for pressing the screen of the terminal; and perform, based on the touch parameter, an operation used to adjust a display effect of the third picture.

Optionally, the processing unit 602 is configured to:

obtain a first pixel set and a second pixel set from pixels included in lines in the target picture or the third picture, where the first pixel set includes a first pixel whose distance from the touch point position is less than or equal to a first distance threshold, and the second pixel set includes a second pixel whose distance from the touch point position is greater than the first distance threshold;

obtain a first offset value of each first pixel in the first pixel set and a second offset value of each second pixel in the second pixel set; where the first offset value of each first pixel is greater than the second offset value of each second pixel, or the first offset value of each first pixel is less than the second offset value of each second pixel; and separately translate each first pixel based on the first offset value of each first pixel and a relative position between each first pixel and the touch point position, and separately translate each second pixel based on the second offset value of each second pixel and a relative position between each second pixel and the touch point position.

Optionally, the processing unit 602 is configured to:

when the touch parameter includes the touch point position, obtain a distance between a pixel included in each line in the target picture and the touch point position;

obtain a first brightness adjustment value of the pixel included in each line in the target picture based on the distance between the pixel included in each line in the target picture and the touch point position; and adjust, based on the first brightness adjustment value of the pixel included in each line in the target picture, brightness of displaying the pixel included in each line in the target picture.

Optionally, the processing unit 602 is configured to:

when the touch parameter includes the pressure for pressing the screen of the terminal, obtain a second brightness adjustment value based on the pressure for pressing the screen of the terminal, and adjust, based on the second brightness adjustment value, the brightness of displaying the pixel included in each line in the target picture.

Optionally, the display unit 601 is configured to:

superimpose a gradient mask on the target picture to obtain a third picture, and display the third picture, where the gradient mask includes a display region and a non-display region, and transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower.

Optionally, the processing unit 602 is configured to:

when the touch parameter includes the touch area, obtain the radius of the display region included in the gradient mask based on the touch area, and adjust an area of the display region included in the gradient mask based on the radius.

Optionally, the processing unit 602 is further configured to:

obtain data collected by at least one sensor in the terminal, obtain a third brightness adjustment value based on the collected data, and adjust, based on the third brightness adjustment value, the brightness of displaying the pixel included in each line in the target picture; or obtain user vital sign data collected by a wearable device, obtain a fourth brightness adjustment value based on the user vital sign data, and adjust, based on the fourth brightness adjustment value, the brightness of displaying the pixel included in each line in the target picture.

Optionally, the processing unit 602 is further configured to: when duration for displaying the target picture reaches a duration threshold, obtain a picture taken by a front-facing camera of the terminal; and the display unit 601 is further configured to: when the picture includes a human eye image, display the target picture in a first time period, where the first time period is a time period that is closest to a current time and whose duration is preset duration.

Optionally, the display unit 601 is further configured to:

when the fourth picture does not include a human eye image, and it is detected that the terminal is operated by a user or that a distance between an obstacle in front of the screen of the terminal and the screen of the terminal is less than a second distance threshold, display the target picture in the first time period.

In this embodiment of this application, when the user touches the displayed target picture, the touch parameter for touching the screen of the terminal is obtained, and the operation used to adjust the display effect of the target is performed based on the touch parameter, to improve the effect of displaying the target picture.

Figure 7:
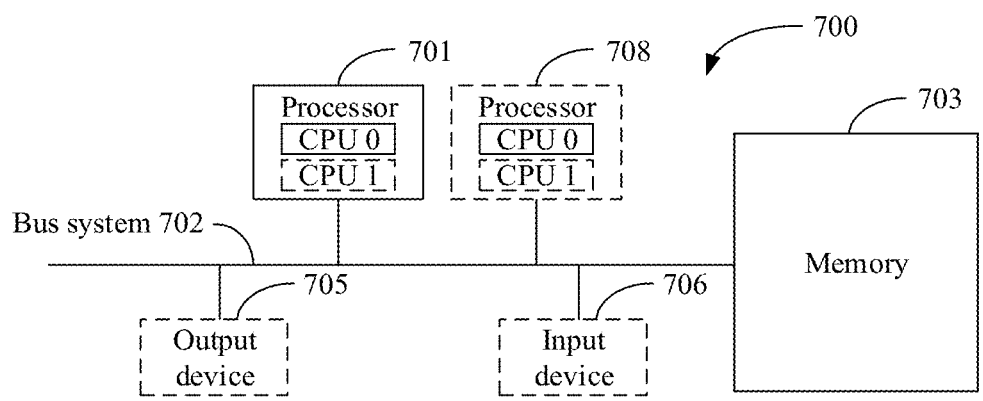
FIG. 7 is a schematic structural diagram of another picture obtaining apparatus according to an embodiment of this application.

Refer to FIG. 7. FIG. 7 is a schematic structural diagram of a picture obtaining apparatus 700 according to an embodiment of this application. The apparatus 700 includes at least one processor 701, a bus system 702, and a memory 703.

The apparatus 700 is an apparatus of a hardware structure, and may be configured to implement functional units in the apparatus in FIG. 5. For example, a person skilled in the art may figure out that the obtaining unit 501, the translation unit 502, and the setting unit 503 in the apparatus 500 shown in FIG. 5 may be implemented by the at least one processor 701 by invoking code in the memory 703.

Optionally, the apparatus 700 may be further configured to implement a function of the terminal in the embodiment shown in FIG. 1, or implement a function of the server in the embodiment shown in FIG. 1.

Optionally, the processor 701 may be a general-purpose central processing unit (central processing unit, CPU), a microprocessor, an application-specific integrated circuit (application-specific integrated circuit, ASIC), or one or more integrated circuits configured to control program execution in the solutions of this application.

The bus system 702 may include a path for transmitting information between the foregoing components.

The memory 703 may be a read-only memory (read-only memory, ROM) or another type of static storage device that can store static information and an instruction, a random access memory (random access memory, RAM) or another type of dynamic storage device that can store information and an instruction, an electrically erasable programmable read-only memory (electrically erasable programmable read-only memory, EEPROM), a compact disc read-only memory (compact disc read-only memory, CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 703 is not limited thereto. The memory may exist independently, and is connected to the processor through the bus. The memory may be integrated with the processor.

The memory 703 is configured to store application program code for performing the solutions of this application, and execution of the solutions is controlled by the processor 701. The processor 701 is configured to execute the application code stored in the memory 703, to implement a function in the method in this patent.

During specific implementation, in an embodiment, the processor 701 may include one or more CPUs, for example, a CPU 0 and a CPU 1 in FIG. 7.

During specific implementation, in an embodiment, the apparatus 700 may include a plurality of processors, for example, a processor 701 and a processor 708 in FIG. 7. Each of the processors may be a single-core (single-CPU) processor, or may be a multi-core (multi-CPU) processor. The processor herein may refer to one or more devices, circuits, and/or processing cores configured to process data (for example, a computer program instruction).

In specific implementation, in an embodiment, the apparatus 700 may further include an output device 705 and an input device 706. The output device 705 communicates with the processor 701, and may display information in a plurality of manners. For example, the output device 705 may be a liquid crystal display (liquid crystal display, LCD), a light emitting diode (light emitting diode, LED) display device, a cathode ray tube (cathode ray tube, CRT) display device, a projector (projector), or the like. The input device 706 communicates with the processor 701, and may receive a user input in a plurality of manners. For example, the input device 706 may be a mouse, a keyboard, a touchscreen device, a sensor device, or the like.

Figure 8:
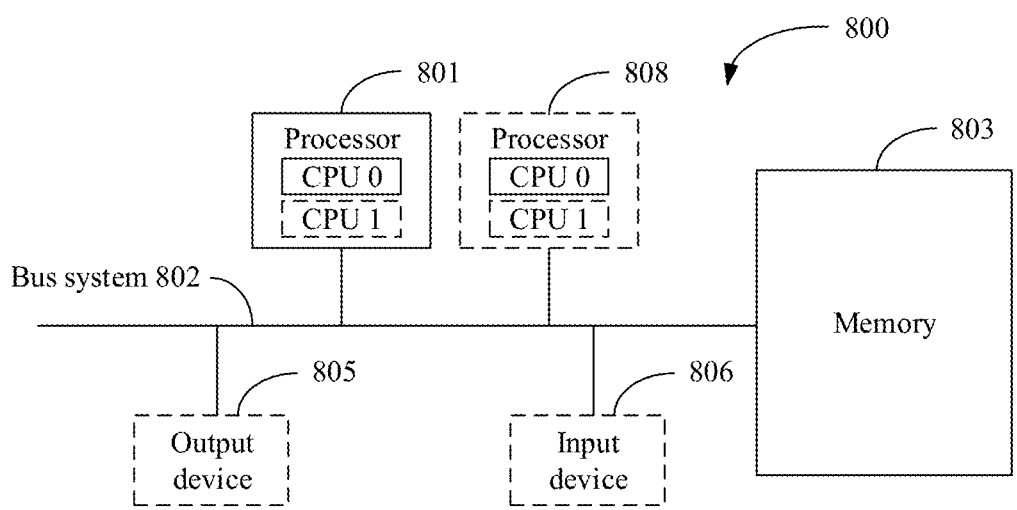
FIG. 8 is a schematic structural diagram of another picture processing apparatus according to an embodiment of this application.

Refer to FIG. 8. FIG. 8 is a schematic structural diagram of a picture processing apparatus 800 according to an embodiment of this application. The apparatus 800 includes at least one processor 801, a bus system 802, a memory 803, and an output device 805.

The apparatus 800 is an apparatus of a hardware structure, and may be configured to implement functional units in the apparatus in FIG. 6. For example, a person skilled in the art may figure out that the processing unit 602 in the apparatus 600 shown in FIG. 6 may be implemented by the at least one processor 801 by invoking code in the memory 803, and the display unit 601 may be implemented by the output device 805.

Optionally, the apparatus 800 may be further configured to implement a function of the terminal in the embodiment shown in FIG. 1, or implement a function of the server in the embodiment shown in FIG. 1.

Optionally, the processor 801 may be a general-purpose central processing unit (central processing unit, CPU), a microprocessor, an application-specific integrated circuit (application-specific integrated circuit, ASIC), or one or more integrated circuits configured to control program execution in the solutions of this application.

The bus system 802 may include a path for transmitting information between the foregoing components.

The memory 803 may be a read-only memory (read-only memory, ROM) or another type of static storage device that can store static information and an instruction, a random access memory (random access memory, RAM) or another type of dynamic storage device that can store information and an instruction, an electrically erasable programmable read-only memory (electrically erasable programmable read-only memory, EEPROM), a compact disc read-only memory (compact disc read-only memory, CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 803 is not limited thereto. The memory may exist independently, and is connected to the processor through the bus. The memory may be integrated with the processor.

The memory 803 is configured to store application code for executing the solutions in this application, and the processor 801 controls the execution. The processor 801 is configured to execute the application code stored in the memory 803, to implement a function in the method in this patent.

In specific implementation, in an embodiment, the processor 801 may include one or more CPUs, for example, a CPU 0 and a CPU 1 in FIG. 8.

During specific implementation, in an embodiment, the apparatus 800 may include a plurality of processors, for example, a processor 801 and a processor 808 in FIG. 8. Each of the processors may be a single-core (single-CPU) processor, or may be a multi-core (multi-CPU) processor. The processor herein may refer to one or more devices, circuits, and/or processing cores configured to process data (for example, a computer program instruction).

In specific implementation, in an embodiment, the apparatus 800 may further include an input device 806. The output device 805 communicates with the processor 801, and may display information in a plurality of manners. For example, the output device 805 may be a liquid crystal display (liquid crystal display, LCD), a light emitting diode (light emitting diode, LED) display device, a cathode ray tube (cathode ray tube, CRT) display device, or a projector (projector). The input device 806 communicates with the processor 801, and may accept input of a user in a plurality of manners. For example, the input device 806 may be a mouse, a keyboard, a touchscreen device, or a sensing device.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An image obtaining method, comprising:
   obtaining a grayscale image corresponding to a first picture and a first image, wherein a size of the first picture is equal to a size of the first image, the first image comprises N parallel lines, wherein a spacing between two adjacent lines of the N parallel lines does not exceed a spacing threshold, and N is an integer greater than 1;
   translating a pixel comprised in each line of the N parallel lines in the first image based on the grayscale image, to obtain a second image, including: converting each line in the first image into a curved line to obtain a third image; and translating a pixel comprised in each line in the third image based on the grayscale image, to obtain the second image, wherein the second image comprises a contour of an image in the first picture; and
   setting a pixel value of each pixel comprised in each line in the second image, to obtain a second picture.

2. The method according to claim 1, wherein the converting each line in the first image into the curved line comprises:
   obtaining a random value of a pixel comprised in a first line based on a position of the pixel comprised in the first line by using a random function, wherein the first line is any line in the first image;
   obtaining an offset value of the pixel comprised in the first line based on the random value of the pixel comprised in the first line and a spacing between the first line and a second line, wherein the second line is an adjacent line of the first line; and
   separately translating the pixel comprised in the first line based on the offset value of the pixel comprised in the first line, to obtain the curved line.

3. The method according to claim 1, wherein the translating the pixel comprised in each line in the third image based on the grayscale image comprises:
   obtaining a grayscale value of a pixel comprised in a third line from the grayscale image based on a position of the pixel comprised in the third line, wherein the third line is any line in the third image;
   obtaining an offset value of the pixel comprised in the third line based on the grayscale value of the pixel comprised in the third line; and separately translating the pixel comprised in the third line based on the offset value of the pixel comprised in the third line.

4. The method according to claim 1, wherein the setting, in the second image, the pixel value of each pixel comprised in each line comprises:
obtaining a target image region from the first picture based on a target position of a target pixel, wherein the target pixel is a pixel comprised in any line in the second image, a position of a central pixel in the target image region is the target position, and a radius of the target image region is a first radius threshold;
determining a target pixel value based on a pixel value of each pixel in the target image region; and
setting a pixel value of the target pixel to the target pixel value.

5. The method according to claim 1, wherein the setting the pixel value of each pixel comprised in each line in the second image, to obtain the second picture comprises:
obtaining environmental factor information of a current environment, wherein the environmental factor information comprises at least one of a geographical environment type, temperature information, and time information;
obtaining, based on the environmental factor information of the current environment, an environmental color pixel value corresponding to the current environment based on a correspondence between environmental factor information and an environmental color pixel value; and
setting the pixel value of each pixel comprised in each line in the second image to the environmental color pixel value corresponding to the current environment, to obtain the second picture.

6. The method according to claim 1, wherein after the setting the pixel value of each pixel comprised in each line in the second image, to obtain the second picture, the method further comprises:
displaying the second picture on a screen of a terminal.

7. The method according to claim 1, wherein after the setting the pixel value of each pixel comprised in each line in the second image, to obtain the second picture, the method further comprises:
superimposing a gradient mask on the second picture to obtain a third picture, and displaying the third picture on a screen of a terminal, wherein the gradient mask comprises a display region and a non-display region, transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower than the transparency threshold.

8. The method according to claim 7, wherein after the superimposing the gradient mask on the second picture, the method further comprises:
obtaining a touch parameter for touching the screen of the terminal, wherein the touch parameter comprises at least one of a touch point position, a touch area, and pressure for pressing the screen of the terminal; and
performing, based on the touch parameter, an operation used to adjust a display effect of the third picture.

9. The method according to claim 8, wherein the performing, based on the touch parameter, the operation used to adjust the display effect of the third picture comprises:
in response to the touch parameter comprising the touch point position, obtaining a first pixel set and a second pixel set from pixels comprised in lines in the third picture, wherein the first pixel set comprises a first pixel whose distance from the touch point position is less than or equal to a first distance threshold, and the second pixel set comprises a second pixel whose distance from the touch point position is greater than the first distance threshold;
obtaining an offset value of each first pixel in the first pixel set and a offset value of each second pixel in the second pixel set, wherein the offset value of each first pixel is greater than the offset value of each second pixel, or the offset value of each first pixel is less than the offset value of each second pixel; and
separately translating each first pixel based on the offset value of each first pixel and a relative position between each first pixel and the touch point position, and separately translating each second pixel based on the offset value of each second pixel and a relative position between each second pixel and the touch point position.

10. The method according to claim 8, wherein the performing, based on the touch parameter, the operation used to adjust the display effect of the third picture comprises:
in response to the touch parameter comprising the touch point position, obtaining a distance between the pixel comprised in each line in the third picture and the touch point position;
obtaining a first brightness adjustment value of the pixel comprised in each line in the third picture based on the distance between the pixel comprised in each line in the third picture and the touch point position; and
adjusting, based on the first brightness adjustment value of the pixel comprised in each line in the third picture, brightness of displaying the pixel comprised in each line in the third picture.

11. The method according to claim 8, wherein the performing, based on the touch parameter, the operation used to adjust the display effect of the third picture comprises:
in response to the touch parameter comprising the pressure for pressing the screen of the terminal, obtaining a second brightness adjustment value based on the pressure for pressing the screen of the terminal, and adjusting, based on the second brightness adjustment value, the brightness of displaying the pixel comprised in each line in the third picture; and/or
in response to the touch parameter comprising the touch area, obtaining the radius of the display region comprised in the gradient mask based on the touch area, and adjusting an area of the display region comprised in the gradient mask based on the radius.

12. The method according to claim 7, wherein after the displaying the third picture on the screen of the terminal, the method further comprises:
obtaining data collected by at least one sensor in the terminal, obtaining a third brightness adjustment value based on the collected data, and adjusting, based on the third brightness adjustment value, the brightness of displaying the pixel comprised in each line in the third picture; or
obtaining user vital sign data collected by a wearable device, obtaining a fourth brightness adjustment value based on the user vital sign data, and adjusting, based on the fourth brightness adjustment value, the brightness of displaying the pixel comprised in each line in the third picture.

13. The method according to claim 7, wherein after the displaying the third picture on the screen of the terminal, the method further comprises:
in response to duration for displaying the third picture reaching a duration threshold, obtaining a fourth picture taken by a front-facing camera of the terminal; and
in response to the fourth picture comprising a human eye image, displaying the third picture in a first time period, wherein the first time period is a time period that is closest to a current time and whose duration is preset.

14. The method according to claim 13, wherein after the obtaining the fourth picture taken by a front-facing camera of the terminal, the method further comprises:
in response to the fourth picture not comprising a human eye image, and it being detected that the terminal is operated by a user or that a distance between an obstacle in front of the screen of the terminal and the screen of the terminal is less than a second distance threshold, displaying the third picture in the first time period.

15. A picture processing method, comprising:
displaying a target picture, wherein the target picture comprises a contour of an image generated based on a line;
obtaining a touch parameter for touching a screen of a terminal, wherein the touch parameter comprises at least one of a touch point position, a touch area, and pressure for pressing the screen of the terminal;
performing, based on the touch parameter, an operation used to adjust a display effect of the target picture, including:
in response to the touch parameter comprising the touch point position, obtaining a first pixel set and a second pixel set from pixels comprised in lines in the target picture, wherein the first pixel set comprises a first pixel whose distance from the touch point position is less than or equal to a first distance threshold, and the second pixel set comprises a second pixel whose distance from the touch point position is greater than the first distance threshold;
obtaining an offset value of each first pixel in the first pixel set and a offset value of each second pixel in the second pixel set, wherein the offset value of each first pixel is greater than the offset value of each second pixel, or the offset value of each first pixel is less than the offset value of each second pixel; and
separately translating each first pixel based on the offset value of each first pixel and a relative position between each first pixel and the touch point position, and separately translating each second pixel based on the offset value of each second pixel and a relative position between each second pixel and the touch point position.

16. The method according to claim 15, wherein the performing, based on the touch parameter, the operation used to adjust the display effect of the target picture comprises:
in response to the touch parameter comprising the pressure for pressing the screen of the terminal, obtaining a second brightness adjustment value based on the pressure for pressing the screen of the terminal, and adjusting, based on the second brightness adjustment value, the brightness of displaying the pixel comprised in each line in the target picture.

17. The method according to claim 15, wherein the displaying the target picture comprises:
superimposing a gradient mask on the target picture to obtain a third picture, and displaying the third picture, wherein the gradient mask comprises a display region and a non-display region, and transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower than the transparency threshold.

18. The method according to claim 17, wherein the performing, based on the touch parameter, the operation used to adjust the display effect of the target picture comprises:
in response to the touch parameter comprising the touch area, obtaining the radius of the display region comprised in the gradient mask based on the touch area, and adjusting an area of the display region comprised in the gradient mask based on the radius.

19. The method according to claim 15, wherein after the target picture is displayed on the screen of the terminal, the method further comprises:
obtaining data collected by at least one sensor in the terminal, obtaining a third brightness adjustment value based on the collected data, and adjusting, based on the third brightness adjustment value, the brightness of displaying the pixel comprised in each line in the target picture; or
obtaining user vital sign data collected by a wearable device, obtaining a fourth brightness adjustment value based on the user vital sign data, and adjusting, based on the fourth brightness adjustment value, the brightness of displaying the pixel comprised in each line in the target picture.

20. The method according to claim 15, wherein after the target picture is displayed on the screen of the terminal, the method further comprises:
in response to duration for displaying the target picture reaching a duration threshold, obtaining a picture taken by a front-facing camera of the terminal; and
in response to the picture comprising a human eye image, displaying the target picture in a first time period, wherein the first time period is a time period that is closest to a current time and whose duration is preset.

21. The method according to claim 20, wherein after the obtaining the picture taken by the front-facing camera of the terminal, the method further comprises:
in response to the picture not comprising a human eye image, and it being detected that the terminal is operated by a user or that a distance between an obstacle in front of the screen of the terminal and the screen of the terminal is less than a second distance threshold, displaying the target picture in the first time period.

22. A picture obtaining apparatus, comprising a processor and memory, the memory having processor executable instructions stored thereon, which when executed cause the processor to perform a method, the method comprising:
obtaining a grayscale image corresponding to a first picture and a first image, wherein a size of the first picture is equal to a size of the first image, the first image comprises N parallel lines, wherein a spacing between two adjacent lines of the N parallel lines does not exceed a spacing threshold, and N is an integer greater than 1;

translating a pixel comprised in each line of the N parallel lines in the first image based on the grayscale image, to obtain a second image, including: converting each line in the first image into a curved line to obtain a third image; and translating a pixel comprised in each line in the third image based on the grayscale image, to obtain the second image, wherein the second image comprises a contour of an image in the first picture; and setting a pixel value of each pixel comprised in each line in the second image, to obtain a second picture.

23. The apparatus according to claim 22, wherein the method performed by the processor further comprises:

obtaining a random value of a pixel comprised in a first line based on a position of the pixel comprised the first line by using a random function, wherein the first line is any line in the first image;

obtaining an offset value of the pixel comprised in the first line based on the random value of the pixel comprised in the first line and a spacing between the first line and a second line, wherein the second line is an adjacent line of the first line; and separately translating the pixel comprised in the first line based on the offset value of the pixel comprised in the first line, to obtain the curved line.

24. The apparatus according to claim 22, wherein the method performed by the processor further comprises:

obtaining a grayscale value of a pixel comprised in a third line from the grayscale image based on a position of the pixel comprised in the third line, wherein the third line is any line in the third image;

obtaining an offset value of the pixel comprised in the third line based on the grayscale value of the pixel comprised in the third line; and separately translating the pixel comprised in the third line based on the offset value of the pixel comprised in the third line.

25. The apparatus according to claim 22, wherein the method performed by the processor further comprises:

obtaining a target image region from the first picture based on a target position of a target pixel, wherein the target pixel is a pixel comprised in any line in the second image, a position of a central pixel in the target image region is the target position, and a radius of the target image region is a first radius threshold;

determining a target pixel value based on a pixel value of each pixel in the target image region; and setting a pixel value of the target pixel to the target pixel value.

26. The apparatus according to claim 22, wherein the method performed by the processor further comprises:

obtaining environmental factor information of a current environment, wherein the environmental factor information comprises at least one of a geographical environment type, temperature information, and time information;

obtaining, based on the environmental factor information of the current environment, an environmental color pixel value corresponding to the current environment based on a correspondence between environmental factor information and an environmental color pixel value; and setting the pixel value of each pixel comprised in each line in the second image to the environmental color pixel value corresponding to the environmental factor information of the current environment, to obtain the second picture.

27. The apparatus according to claim 22, wherein the method performed by the processor further comprises:

displaying the second picture on a screen of a terminal.

28. The apparatus according to claim 22, wherein the method performed by the processor further comprises:

superimposing a gradient mask on the second picture to obtain a third picture, wherein the gradient mask comprises a display region and a non-display region, transparency of the non-display region is less than a transparency threshold, a central position of the display region is a preset position on a screen of a terminal, a radius of the display region is a second radius threshold, transparency of the display region is greater than or equal to the transparency threshold, and transparency of a region that is in the display region and that is farther away from the central position is lower than the transparency threshold; and displaying the third picture on the screen of the terminal.

29. The apparatus according to claim 28, wherein the method performed by the processor further comprises:

obtaining a touch parameter for touching the screen of the terminal, wherein the touch parameter comprises at least one of a touch point position, a touch area, and pressure for pressing the screen of the terminal; and performing, based on the touch parameter, an operation used to adjust a display effect of the third picture.

30. The apparatus according to claim 29, wherein the method performed by the processor further comprises:

in response to the touch parameter comprising the touch point position, obtaining a first pixel set and a second pixel set from pixels comprised in lines in the third picture, wherein the first pixel set comprises a first pixel whose distance from the touch point position is less than or equal to a first distance threshold, and the second pixel set comprises a second pixel whose distance from the touch point position is greater than the first distance threshold;

obtaining an offset value of each first pixel in the first pixel set and a offset value of each second pixel in the second pixel set, wherein the offset value of each first pixel is greater than the offset value of each second pixel, or the offset value of each first pixel is less than the offset value of each second pixel; and separately translating each first pixel based on the offset value of each first pixel and a relative position between each first pixel and the touch point position, and separately translating each second pixel based on the offset value of each second pixel and a relative position between each second pixel and the touch point position.

31. The apparatus according to claim 29, wherein the method performed by the processor further comprises:

in response to the touch parameter comprising the touch point position, obtaining a distance between the pixel comprised in each line in the third picture and the touch point position;

obtaining a first brightness adjustment value of the pixel comprised in each line in the third picture based on the distance between the pixel comprised in each line in the third picture and the touch point position; and adjusting, based on the first brightness adjustment value of the pixel comprised in each line in the third picture, brightness of displaying the pixel comprised in each line in the third picture.

32. The apparatus according to claim 29, wherein the method performed by the processor further comprises:
  in response to the touch parameter comprising the pressure for pressing the screen of the terminal, obtaining a second brightness adjustment value based on the pressure for pressing the screen of the terminal, and adjusting, based on the second brightness adjustment value, the brightness of displaying the pixel comprised in each line in the third picture; and/or
  in response to the touch parameter comprising the touch area, obtaining the radius of the display region comprised in the gradient mask based on the touch area, and adjusting an area of the display region comprised in the gradient mask based on the radius.

33. The apparatus according to claim 29, wherein the method performed by the processor further comprises:
  obtaining data collected by at least one sensor in the terminal, obtaining a third brightness adjustment value based on the collected data, and adjusting, based on the third brightness adjustment value, the brightness of displaying the pixel comprised in each line in the third picture; or
  obtaining user vital sign data collected by a wearable device, obtaining a fourth brightness adjustment value based on the user vital sign data, and adjusting, based on the fourth brightness adjustment value, the brightness of displaying the pixel comprised in each line in the third picture.

34. The apparatus according to claim 29, wherein the method performed by the processor further comprises:
  in response to duration for displaying the third picture reaching a duration threshold, obtaining a fourth picture taken by a front-facing camera of the terminal; and
  in response to the fourth picture comprising a human eye image, displaying the third picture in a first time period, wherein the first time period is a time period that is closest to a current time and whose duration is preset.

35. The apparatus according to claim 34, wherein the method performed by the processor further comprises:
  in response to the fourth picture not comprising a human eye image, and it being detected that the terminal is operated by a user or that a distance between an obstacle in front of the screen of the terminal and the screen of the terminal is less than a second distance threshold, displaying the third picture in the first time period.

36. A picture processing apparatus comprising a processor and memory, the memory having processor executable instructions stored thereon, which when executed cause the processor to perform a method, the method comprising:
  displaying a target picture, wherein the target picture comprises a contour of an image generated based on a line; and
  obtaining a touch parameter for touching a screen of a terminal, wherein the touch parameter comprises at least one of a touch point position, a touch area, and pressure for pressing the screen of the terminal;
  performing, based on the touch parameter, an operation used to adjust a display effect of the target picture, including:
    in response to the touch parameter comprising the touch point position, obtaining a first pixel set and a second pixel set from pixels comprised in lines in the target picture, wherein the first pixel set comprises a first pixel whose distance from the touch point position is less than or equal to a first distance threshold, and the second pixel set comprises a second pixel whose distance from the touch point position is greater than the first distance threshold;
    obtaining an offset value of each first pixel in the first pixel set and a offset value of each second pixel in the second pixel set, wherein the offset value of each first pixel is greater than the offset value of each second pixel, or the offset value of each first pixel is less than the offset value of each second pixel; and
    separately translating each first pixel based on the offset value of each first pixel and a relative position between each first pixel and the touch point position, and separately translating each second pixel based on the offset value of each second pixel and a relative position between each second pixel and the touch point position.

37. The apparatus according to claim 36, wherein the method performed by the processor further comprises:
  in response to the touch parameter comprising the pressure for pressing the screen of the terminal, obtaining a second brightness adjustment value based on the pressure for pressing the screen of the terminal, and adjusting, based on the second brightness adjustment value, the brightness of displaying the pixel comprised in each line in the target picture.

38. The apparatus according to claim 36, wherein the method performed by the processor further comprises:
  superimposing a gradient mask on the target picture to obtain a third picture, and displaying the third picture, wherein the gradient mask comprises a display region and a non-display region, and transparency of the non-display region is less than a transparency threshold, a central position of the display region is a preset position on the screen of the terminal, a radius of the display region is a second radius threshold, transparency of the display region is greater than or equal to the transparency threshold, and transparency of a region that is in the display region and that is farther away from the central position is lower than the transparency threshold.

39. The apparatus according to claim 38, wherein the method performed by the processor further comprises:
  in response to the touch parameter comprising the touch area, obtaining the radius of the display region comprised in the gradient mask based on the touch area, and adjusting an area of the display region comprised in the gradient mask based on the radius.

40. The apparatus according to claim 36, wherein the method performed by the processor further comprises:
  obtaining data collected by at least one sensor in the terminal, obtaining a third brightness adjustment value based on the collected data, and adjusting, based on the third brightness adjustment value, the brightness of displaying the pixel comprised in each line in the target picture; or
  obtaining user vital sign data collected by a wearable device, obtaining a fourth brightness adjustment value based on the user vital sign data, and adjusting, based on the fourth brightness adjustment value, the brightness of displaying the pixel comprised in each line in the target picture.

41. The apparatus according to claim 36, wherein the method performed by the processor further comprises:
  in response to duration for displaying the target picture reaching a duration threshold, obtaining a picture taken by a front-facing camera of the terminal; and
  in response to the picture comprising a human eye image, displaying the target picture in a first time period, wherein the first time period is a time period that is closest to a current time and whose duration is preset.

42. The apparatus according to claim 41, wherein the method performed by the processor further comprises:

in response to the picture not comprising a human eye image, and it being detected that the terminal is operated by a user or that a distance between an obstacle in front of the screen of the terminal and the screen of the terminal is less than a second distance threshold, displaying the target picture in the first time period.

* * * * *